(12) United States Patent
Terada et al.

(10) Patent No.: US 8,525,926 B2
(45) Date of Patent: Sep. 3, 2013

(54) OPTICAL APPARATUS COMPRISING A STEREO MICROPHONE

(75) Inventors: Shuichi Terada, Tokyo (JP); Kengo Hosomi, Kawasaki (JP); Yoichi Kato, Saitama (JP); Kota Ono, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 69 days.

(21) Appl. No.: 13/210,596

(22) Filed: Aug. 16, 2011

(65) Prior Publication Data

US 2012/0044665 A1 Feb. 23, 2012

(30) Foreign Application Priority Data

Aug. 18, 2010 (JP) ................................. 2010-183053

(51) Int. Cl.
*H04N 5/225* (2006.01)
*H04N 9/07* (2006.01)

(52) U.S. Cl.
USPC .......................................... 348/373; 348/337

(58) Field of Classification Search
USPC .......... 348/335, 337–340, 343–344, 373–374
See application file for complete search history.

(56) References Cited

U.S. PATENT DOCUMENTS

| 2004/0080656 | A1* | 4/2004 | Higuchi et al. ............... 348/335 |
| 2006/0056839 | A1* | 3/2006 | Abe et al. ...................... 396/452 |
| 2007/0188631 | A1* | 8/2007 | Yoshitsugu et al. ........ 348/240.3 |
| 2010/0118155 | A1 | 5/2010 | Lee |
| 2010/0165173 | A1* | 7/2010 | Ishii et al. ..................... 348/344 |

FOREIGN PATENT DOCUMENTS

| CN | 1641464 A | 7/2005 |
| CN | 101292194 A | 10/2008 |
| JP | 2007-212630 A | 8/2007 |
| JP | 2009-122640 A | 6/2009 |

OTHER PUBLICATIONS

U.S. Appl. No. 13/210,582, filed Aug. 16, 2011, Shuichi Terada.
U.S. Appl. No. 13/210,610, filed Aug. 16, 2011, Shuichi Terada.
U.S. Appl. No. 13/210,641, filed Aug. 16, 2011, Taro Murakami.

* cited by examiner

*Primary Examiner* — Kelly L Jerabek
(74) *Attorney, Agent, or Firm* — Canon USA Inc IP Division

(57) ABSTRACT

An optical apparatus includes a catoptric element that causes incoming light traveling from an object in a direction of a first optical axis to be refracted in a direction of a second optical axis, a motor that drives an optical member provided on the second optical axis, and a stereo microphone including a left-channel microphone and a right-channel microphone that are provided on a side of the optical apparatus opposite the motor with respect to the second optical axis when seen from an object side and arranged in a direction substantially parallel to the second optical axis.

2 Claims, 24 Drawing Sheets

OPTICAL APPARATUS COMPRISING A STEREO MICROPHONE

BACKGROUND OF THE INVENTION

1. Field of the Invention

The present invention relates to a technique for a zoom lens barrel that changes imaging magnification by moving in the direction of the optical axis thereof between a retracted position and an image-taking position.

2. Description of the Related Art

Among image pickup apparatuses such as digital cameras including zoom lens barrels, an apparatus proposed by Japanese Patent Laid-Open No. 2009-122640 includes, so as to reduce the size thereof, a catoptric element such as a prism that guides incoming light received through a plurality of lens groups to an image pickup device by refracting the incoming light in a direction intersecting the incoming optical axis, which is a first optical axis.

In the above proposal, the light entering through a first lens group provided in the lens barrel is refracted toward the image pickup device in the direction of a second optical axis that is substantially orthogonal to the first optical axis by using the prism or the like provided to the rear of the first lens group.

In the apparatus proposed by Japanese Patent Laid-Open No. 2009-122640, however, motors and so forth are necessary that drive optical members provided on the first and second optical axes during a zooming operation. In such a case, if zooming and focusing operations are simultaneously performed while a movie is being taken, the quality of recording sound may be deteriorated. This is because noise from a plurality of drive units may also be recorded.

SUMMARY OF THE INVENTION

The present invention provides a mechanism employed in an image pickup apparatus including a dioptric system, the mechanism suppressing deterioration in the quality of recording sound due to noise from drive units that drive a plurality of optical members.

According to an aspect of the present invention, an optical apparatus includes a catoptric element that causes incoming light traveling from an object in a direction of a first optical axis to be refracted in a direction of a second optical axis, a motor that drives an optical member provided on the second optical axis, and a stereo microphone including a left-channel microphone and a right-channel microphone that are provided on a side of the optical apparatus opposite the motor with respect to the second optical axis when seen from an object side and arranged in a direction substantially parallel to the second optical axis.

In the above aspect of the present invention, the stereo microphone may be remoter from the motor than a main capacitor for strobe illumination is, the main capacitor being provided on the side opposite the motor with respect to the second optical axis such that a longitudinal direction of the main capacitor is parallel to the second optical axis.

Further features of the present invention will become apparent from the following description of exemplary embodiments with reference to the attached drawings.

DESCRIPTION OF THE EMBODIMENTS

An embodiment of the present invention will now be described with reference to the attached drawings.

Figure 1:
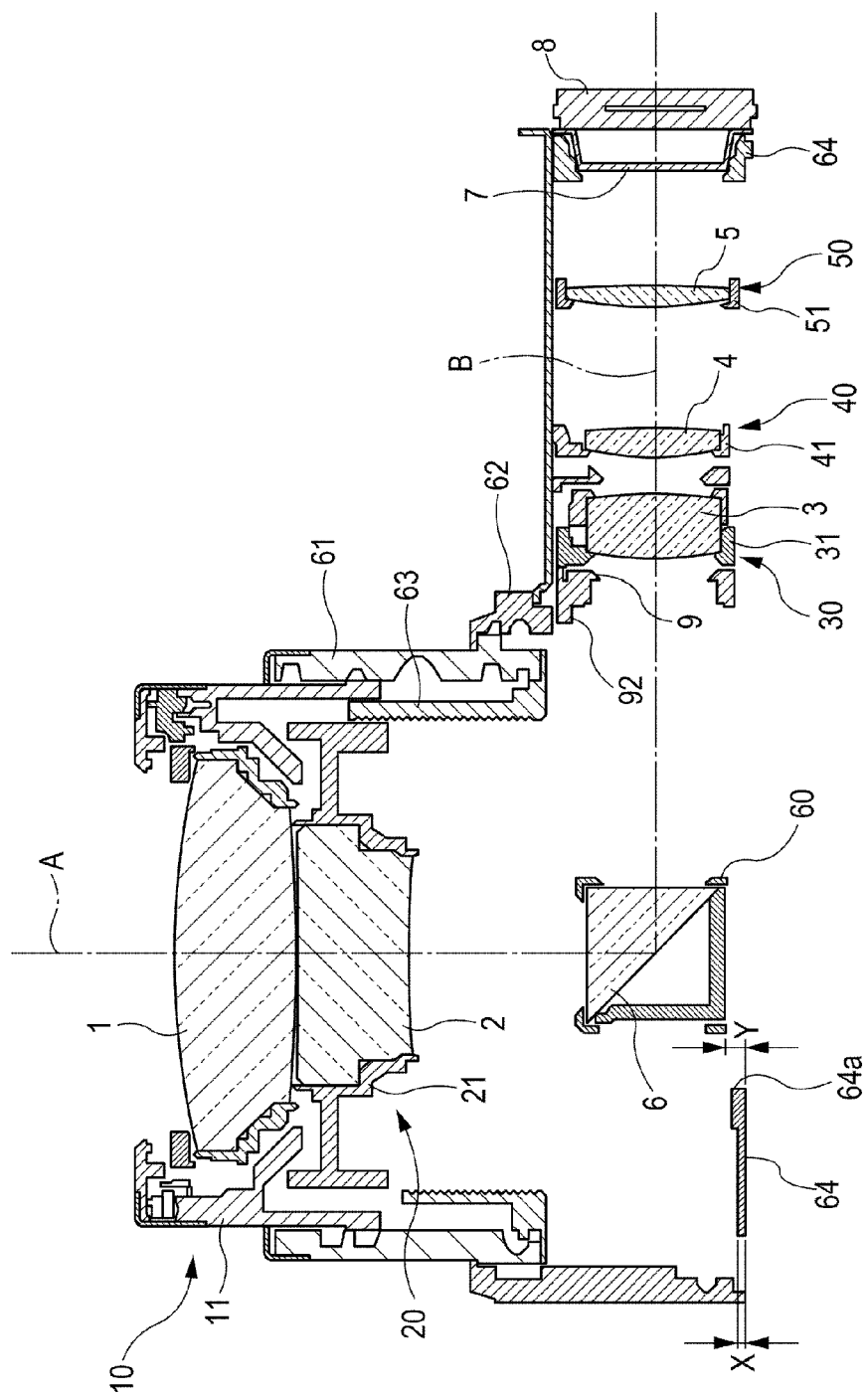
FIG. 1 is a sectional view of an exemplary image pickup apparatus according to an embodiment of the present invention, with a lens barrel thereof at a wide-angle position.
Figure 2:
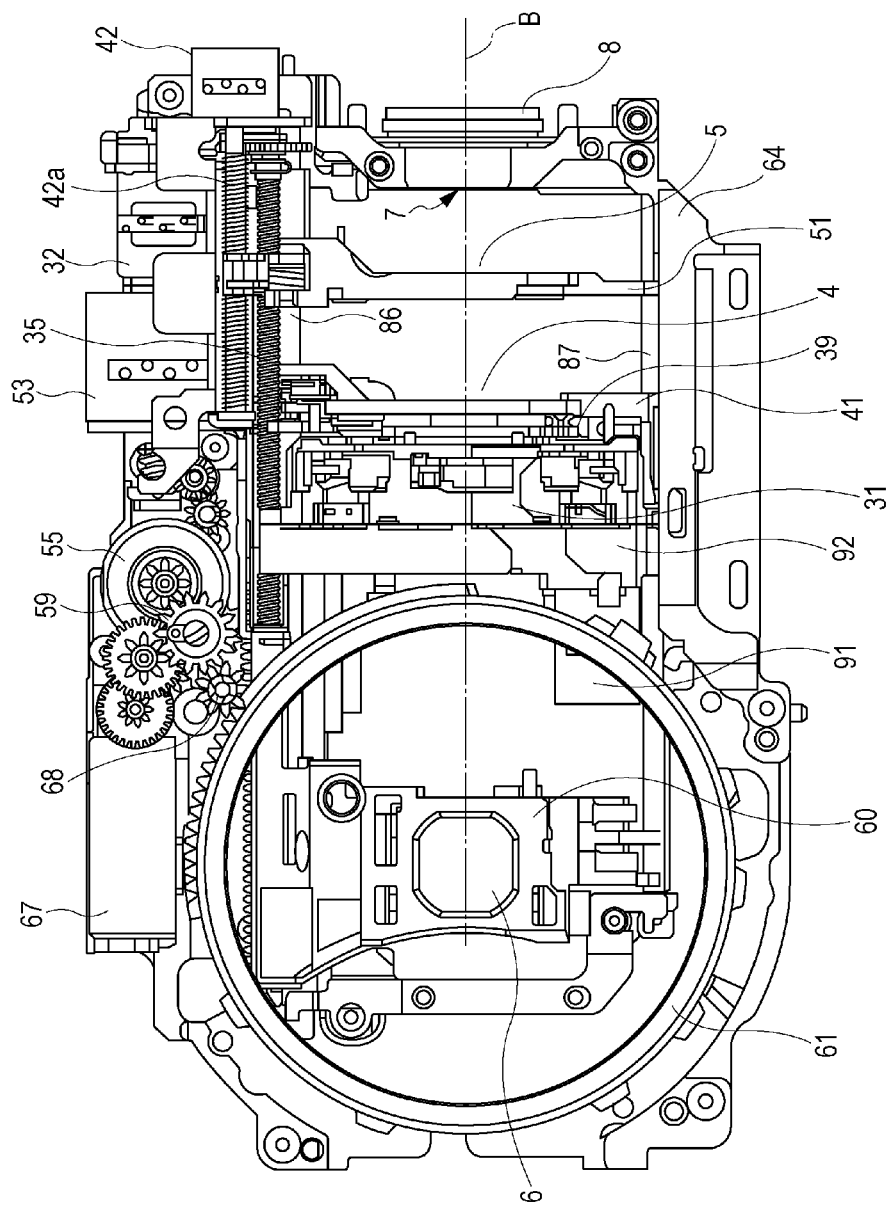
FIG. 2 is a front view of the image pickup apparatus illustrated in FIG. 1 seen from an object side in the direction of a first optical axis.

FIG. 1 is a sectional view of a digital camera as an exemplary image pickup apparatus according to an embodiment of the present invention, with a lens barrel thereof at a wide-angle position. FIG. 2 is a front view of the digital camera illustrated in FIG. 1 seen in the direction of the optical axis of a first lens unit, i.e., an optical axis A. The lens barrel is a zoom lens barrel that changes imaging magnification by moving in the direction of the optical axis thereof between a retracted position and an image-taking position.

As illustrated in FIGS. 1 and 2, the digital camera according to the embodiment includes, as components of the zoom lens barrel, a first lens unit 10, a second lens unit 20, a prism 6, a fixed barrel 62, a cam barrel 61, a straight-movement-guide barrel 63, and a zoom body 64. The zoom body 64 is an exemplary lens-barrel-holding frame. In FIG. 2, the first lens unit 10, the second lens unit 20, the fixed barrel 62, and the straight-movement-guide barrel 63 are not illustrated.

In the first lens unit 10 as an optical member, a first group lens 1 is held by a first-group-lens barrel 11. In the second lens unit 20 as another optical member, a second group lens 2 is held by a second-group-lens barrel 21. The first lens unit 10 and the second lens unit 20 are movable along the optical axis A. Light entering through the first group lens 1 and the second group lens 2 is refracted in the direction of an optical axis B and is guided to an image plane of an image pickup device 8 by the prism 6. The optical axis B intersects the optical axis A of the first group lens 1 and the second group lens 2 at an angle of approximately 90°. The prism 6 is held by a holding member 60 in such a manner as to be movable along the optical axis B. The optical axis A is an exemplary first optical axis according to the present invention, and the optical axis B is an exemplary second optical axis according to the present invention.

The digital camera further includes, between the prism 6 and the image pickup device 8, a stop/shutter 9 that regulates the amount of light used for imaging, a third group lens 3, a fourth group lens 4, a fifth group lens 5, and an optical filter 7 that are provided in that order from the side of the prism 6 toward the image pickup device 8 along the optical axis B. The third group lens 3, the fourth group lens 4, and the fifth group lens 5 are exemplary optical members according to the present invention.

The stop/shutter 9 is fixed to a shutter base plate 92. The third group lens 3 is held by a third-group base plate 31. The third-group base plate 31 and the shutter base plate 92 are joined together with screws or the like, whereby a third lens unit 30 is provided. When the third lens unit 30 is driven by a stepping motor 32, the third lens unit 30 advances or retracts along the optical axis B. Thus, a zooming operation is performed.

Figure 3:
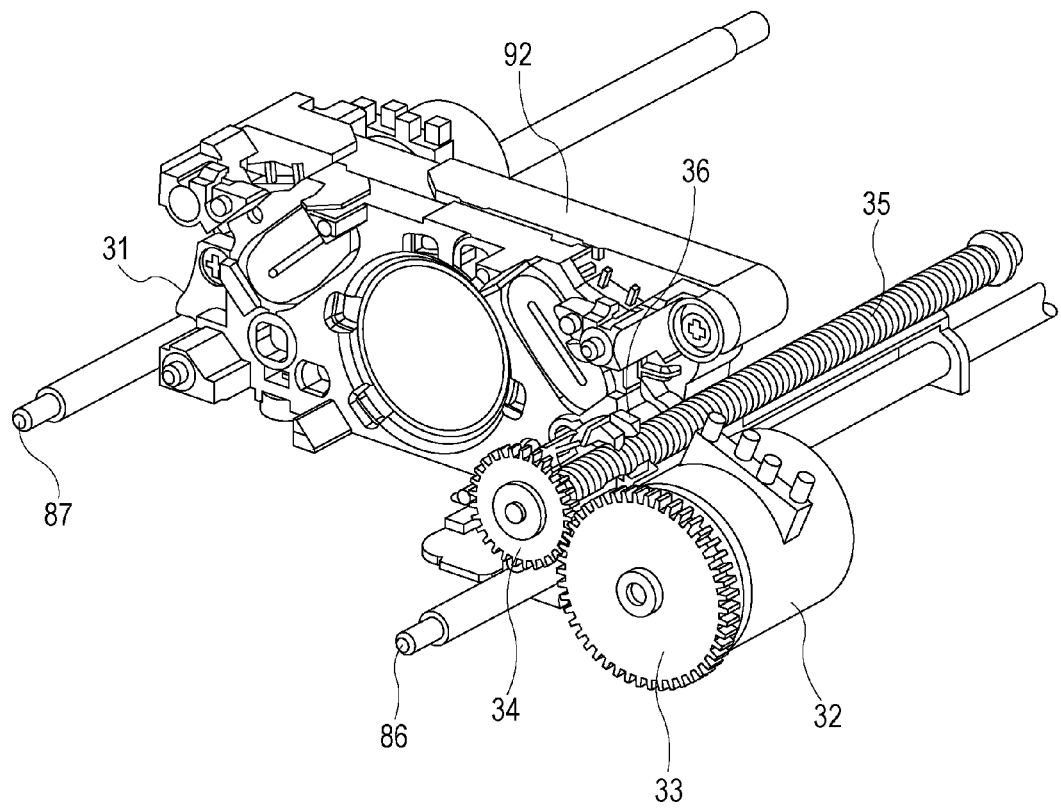
FIG. 3 is a perspective view of a mechanism that drives a third lens unit.

FIG. 3 is a perspective view of a mechanism that drives the third lens unit 30, i.e., an optical member. As illustrated in FIG. 3, the stepping motor 32 is provided on an output shaft thereof with a gear 33. The gear 33 meshes with a gear 34, thereby rotating a screw 35 at an increased speed. A rack 36 is provided on the third-group base plate 31 and meshes with the screw 35. The third-group base plate 31 is supported and held by two guide shafts 86 and 87, which are guide members, extending parallel to the optical axis B. Thus, the third-group base plate 31 is movable along the optical axis B. Therefore, when the screw 35 rotates, the rack 36 is moved by a force acting thereon in the direction of the optical axis B, and the third lens unit 30 moves together with the rack 36 in the direction of the optical axis B.

Figure 4:
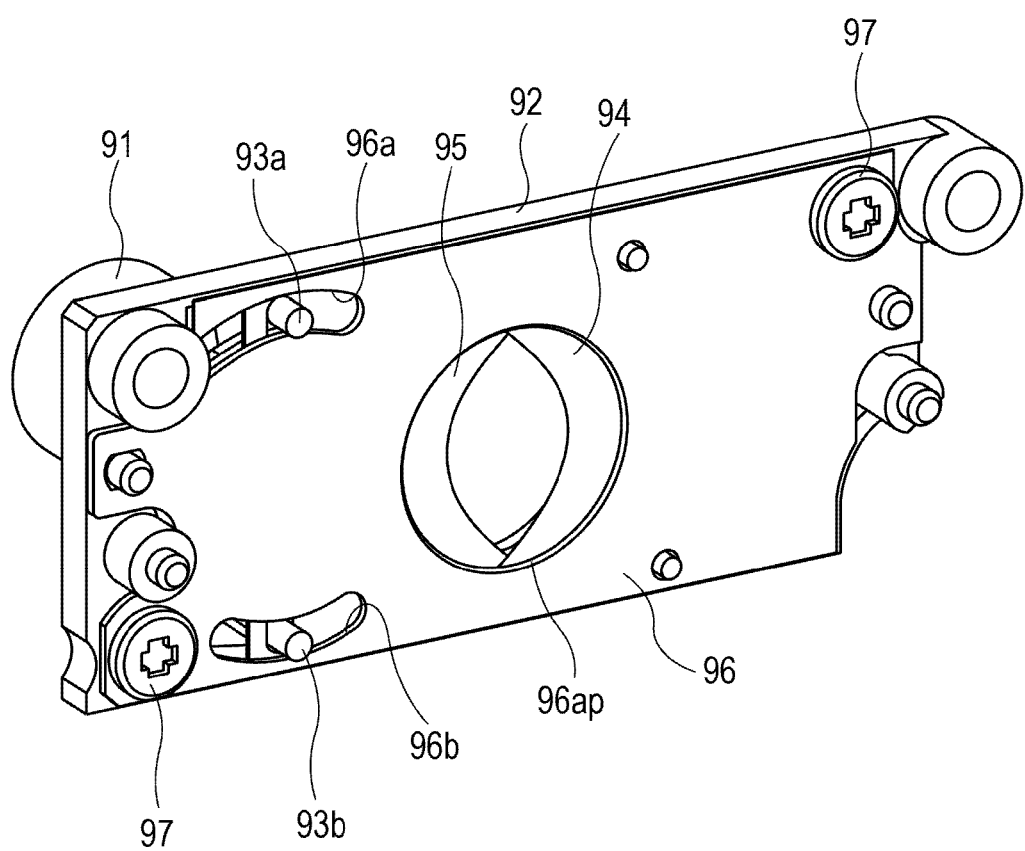
FIG. 4 is a perspective view of a stop/shutter.
Figure 5:
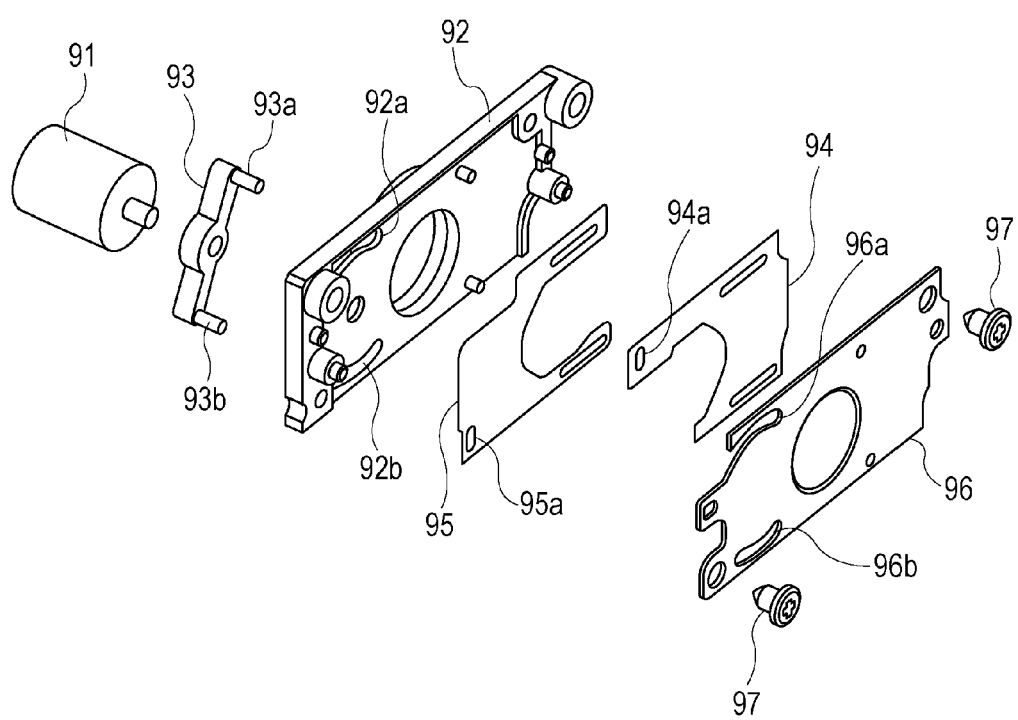
FIG. 5 is an exploded perspective view of the stop/shutter.

FIG. 4 is a perspective view of the stop/shutter 9. FIG. 5 is an exploded perspective view of the stop/shutter 9. As illustrated in FIGS. 4 and 5, the stop/shutter 9 includes a plurality of blades 94 and 95 provided between the shutter base plate 92 and a cover 96 and configured to open and close an aperture 96ap. The cover 96 is provided on the side of the third-group base plate 31. The cover 96 and the shutter base plate 92 are fixed to each other with screws 97.

A stepping motor 91 is an actuator that drives the plurality of blades 94 and 95 of the stop/shutter 9 to open and close. The stepping motor 91 is provided on a motor shaft thereof with a lever 93 extending in a direction orthogonal to the axis of the motor shaft. The lever 93 has shafts 93a and 93b at two respective ends thereof in the direction in which the lever 93 extends.

The shaft 93a is fitted into an arc-shaped hole 92a provided in the shutter base plate 92, an oblong hole 94a provided in the blade 94, and an arc-shaped hole 96a provided in the cover 96 in such a manner as to be movable in the arc-shaped holes 92a and 96a. The shaft 93b is fitted into an arc-shaped hole 92b provided in the shutter base plate 92, an oblong hole 95a provided in the blade 95, and an arc-shaped hole 96b provided in the cover 96 in such a manner as to be movable in the arc-shaped holes 92b and 96b.

When the stepping motor 91 is driven and the lever 93 is rotated, the blades 94 and 95 move in opposite directions. By moving the blades 94 and 95 back and forth, the aperture 96ap is opened and closed, realizing a function as a stop in which the amount of light used for imaging is regulated by adjusting the gap between the blades 94 and 95 that open and close the aperture 96ap and a function as a shutter in which the blades 94 and 95 are moved such that the aperture 96ap that is open is closed.

Referring back to FIGS. 1 and 2, the fourth group lens 4 is held by a fourth-group-lens holder 41, whereby a fourth lens unit 40 as an optical member is provided. The fourth lens unit 40 is supported and held by the guide shafts 86 and 87 in such a manner as to be movable along the optical axis B. The fourth lens unit 40 is urged toward an object side by a spring (not illustrated). When an image is taken, the fourth lens unit 40 is brought into contact with a stopper (not illustrated) and thus becomes stationary at the position illustrated in FIGS. 1 and 2.

The fifth group lens 5 is held by a fifth-group-lens holder 51, whereby a fifth lens unit 50 as an optical member is provided. The fifth lens unit 50 is supported and held by the guide shafts 86 and 87 in such a manner as to be movable along the optical axis B. A zooming operation and a focusing operation are performed by driving a stepping motor 42 and thus rotating a screw 42a in such a manner as to cause the fifth lens unit 50 to advance or retract along the optical axis B. The optical filter 7 has a function as a low-pass filter that eliminates light having high spatial frequencies and a function of eliminating infrared light.

Figure 6:
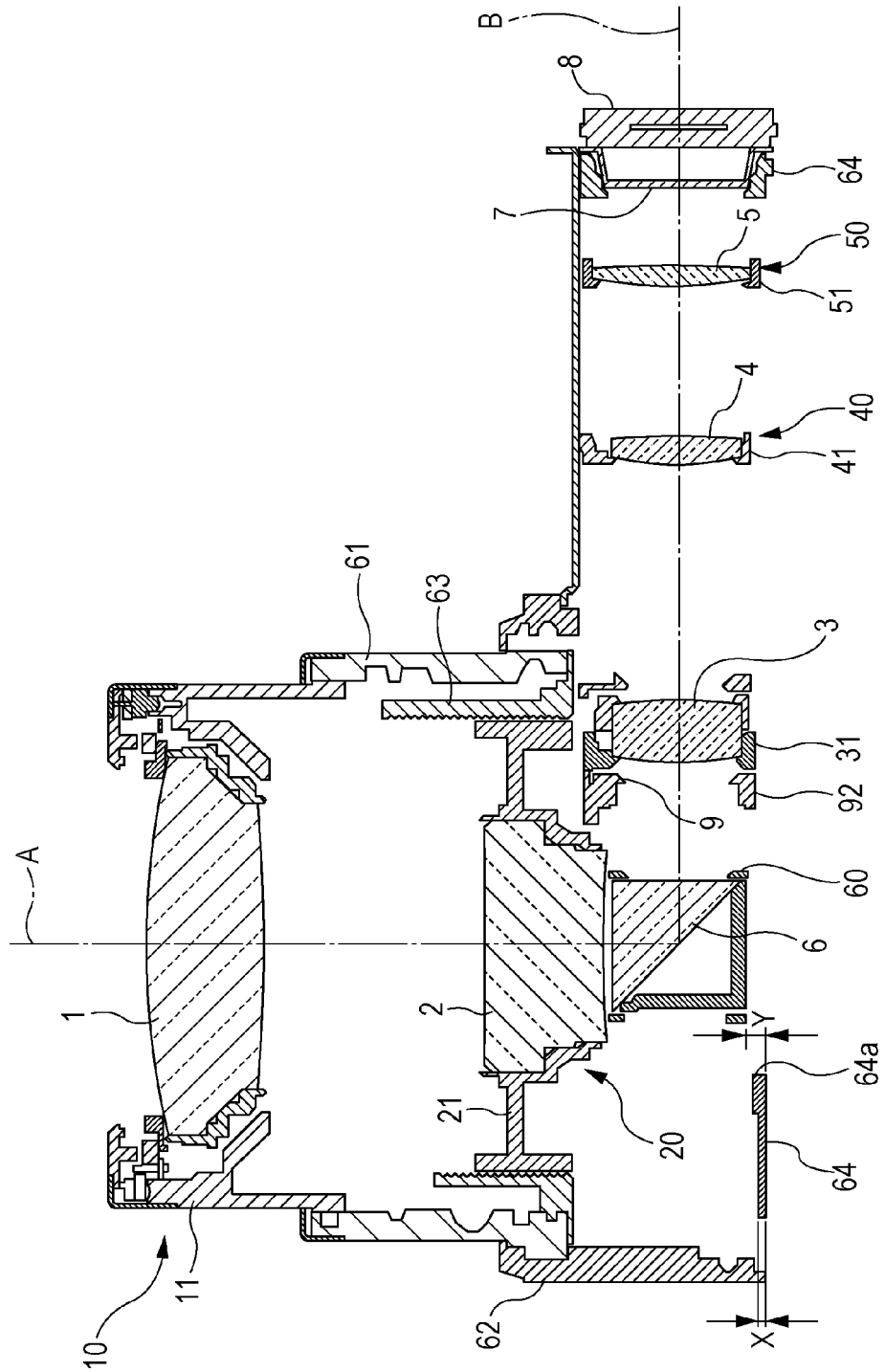
FIG. 6 is a sectional view of the image pickup apparatus with the lens barrel thereof at a telephoto position.
Figure 7:
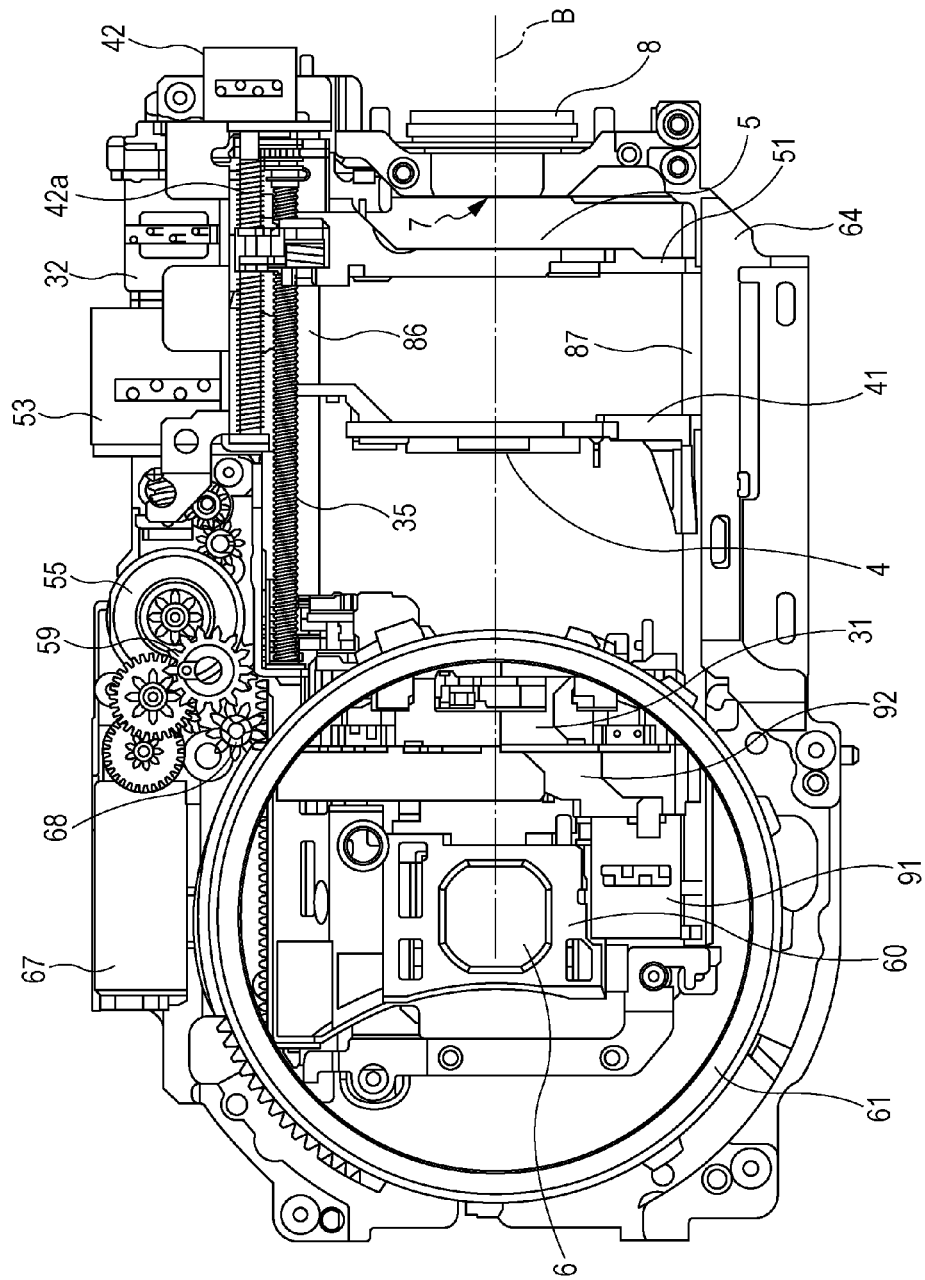
FIG. 7 is a front view of the image pickup apparatus illustrated in FIG. 6 seen from the object side in the direction of the first optical axis.

FIG. 6 is a sectional view of the digital camera with the lens barrel thereof at a telephoto position. FIG. 7 is a front view of the digital camera illustrated in FIG. 6 seen in the direction of the optical axis A. In FIG. 7, the first lens unit 10, the second lens unit 20, the fixed barrel 62, and the straight-movement-guide barrel 63 are not illustrated.

As illustrated in FIGS. 6 and 7, when the lens barrel is moved to the telephoto position, the first lens unit 10 advances along the optical axis A toward the object side, and the second lens unit 20 retracts along the optical axis A and stops at a position near the prism 6. Furthermore, the third lens unit 30 is driven by the stepping motor 32 in such a manner as to move along the optical axis B toward the prism 6 and stops at a position near the prism 6.

In the above state, as illustrated in FIG. 7, the stepping motor 91 that drives the blades 94 and 95 of the stop/shutter 9 to open and close resides below the prism 6 and extends parallel to the optical axis B such that the position thereof in the direction of the optical axis B coincides with that of the prism 6, with the entirety thereof overlapping the prism 6. The fourth lens unit 40 is driven by the stepping motor 42 in such a manner as to move along the optical axis B toward the image pickup device 8 and stops at a position near the image pickup device 8.

Figure 8:
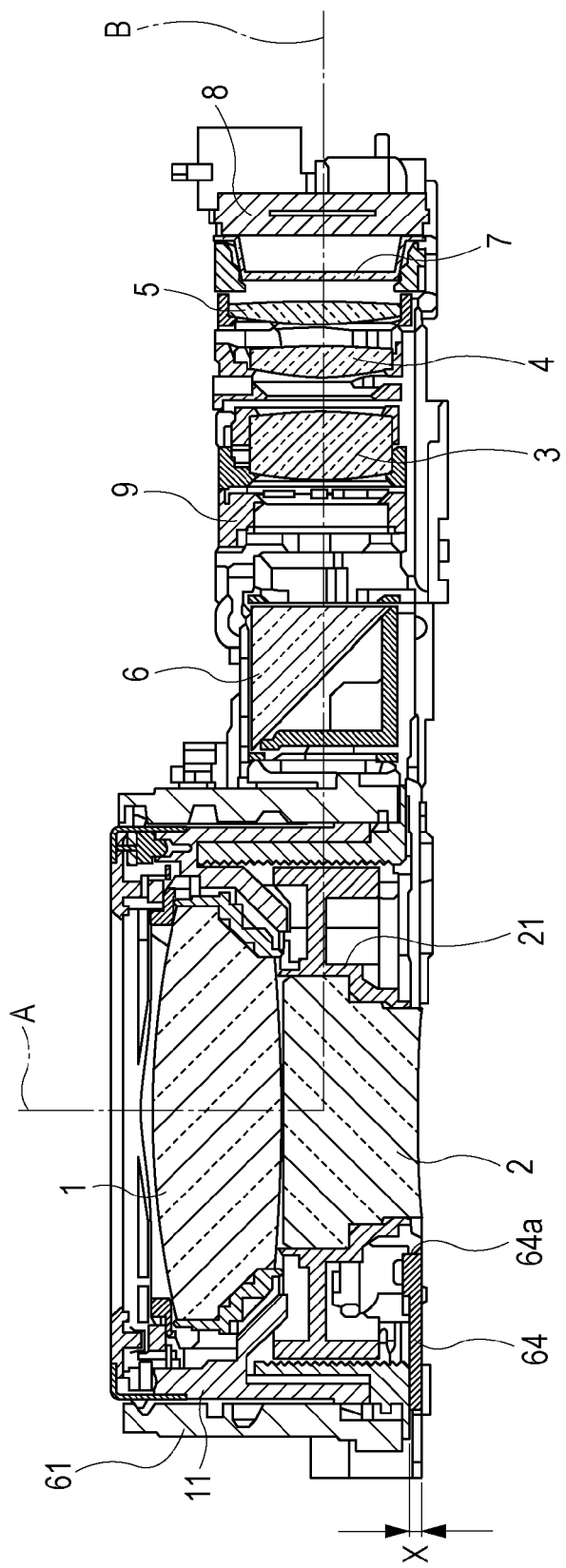
FIG. 8 is a sectional view of the image pickup apparatus with the lens barrel thereof at a retracted position.
Figure 9:
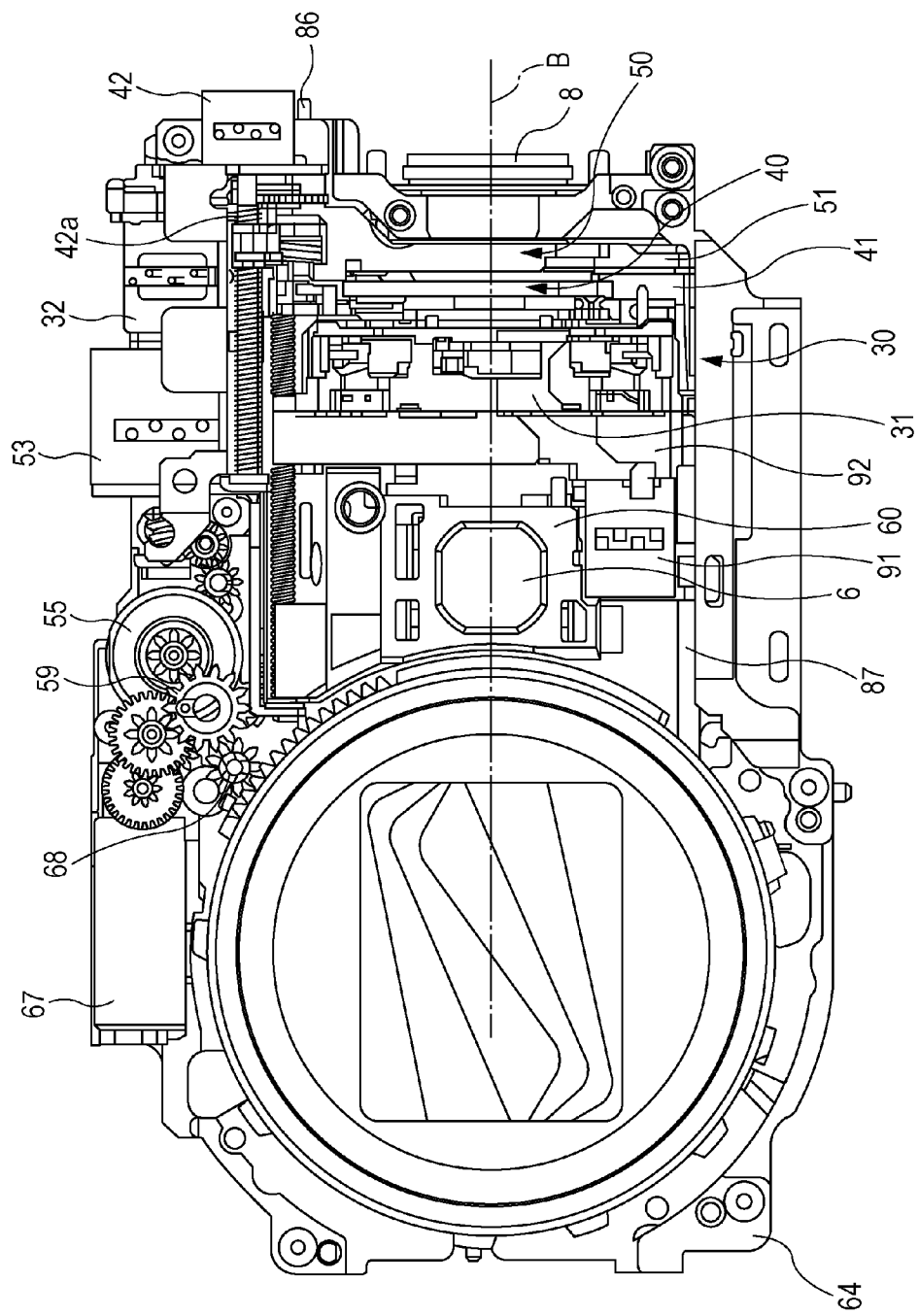
FIG. 9 is a front view of the image pickup apparatus illustrated in FIG. 8 seen from the object side in the direction of the first optical axis.
Figure 15:
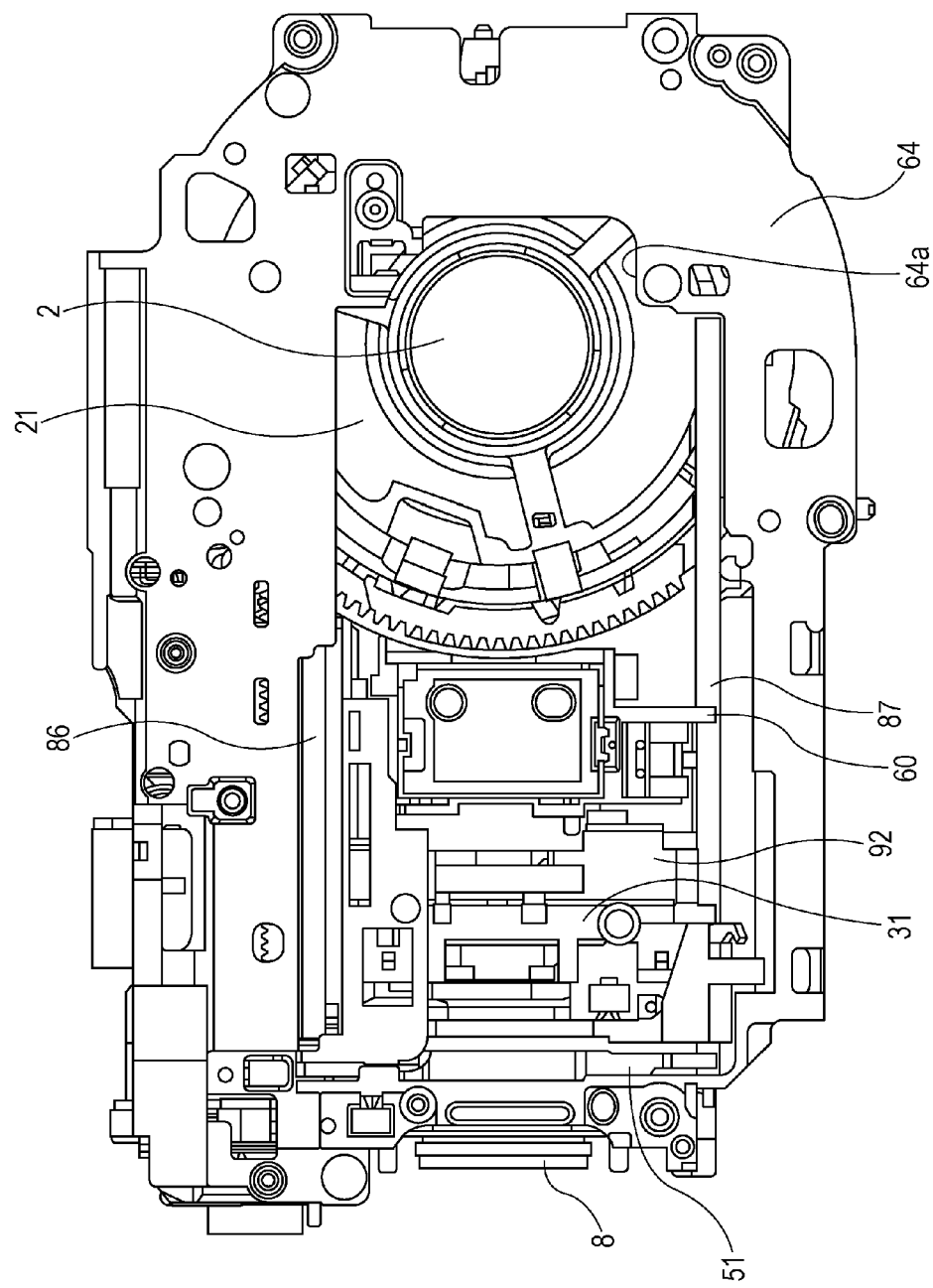
FIG. 15 is a rear view of the image pickup apparatus with the lens barrel thereof at the retracted position.
Figure 16:
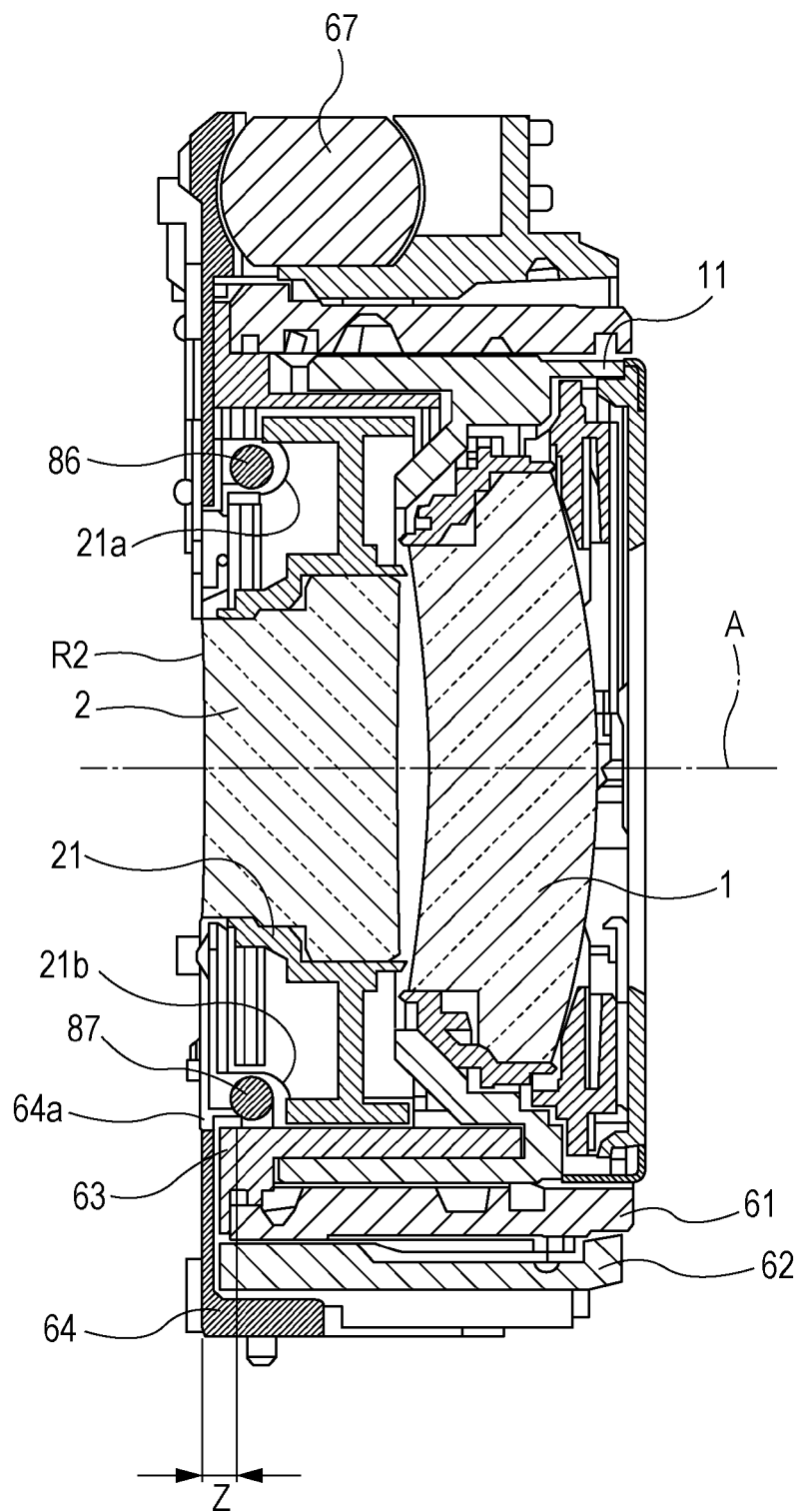
FIG. 16 is a sectional view of the image pickup apparatus taken in a direction orthogonal to a second optical axis, with the lens barrel thereof at the retracted position.

FIG. 8 is a sectional view of the digital camera with the lens barrel thereof at a retracted position. FIG. 9 is a front view of the digital camera illustrated in FIG. 8 seen in the direction of the optical axis A. FIG. 15 is a rear view of the digital camera with the lens barrel thereof at the retracted position. FIG. 16 is a sectional view of the digital camera taken in a direction orthogonal to the optical axis B, with the lens barrel thereof at the retracted position.

As illustrated in FIGS. 8, 9, and 16, when the lens barrel is moved to the retracted position, the prism 6, the third lens unit 30, and the fifth lens unit 50 move along the optical axis B toward the image pickup device 8 in such a manner as not to interfere with one another. In this movement, the fourth lens unit 40 is pushed toward the image pickup device 8 by the third lens unit 30 to the retracted position, thereby moving backward to the retracted position. Thus, a housing space is provided to the rear of the second lens unit 20 and the first lens unit 10.

The zoom body 64 holds the guide shafts 86 and 87 and the optical filter 7. As illustrated in FIG. 15, the guide shafts 86 and 87 each extend such that one axial-direction end thereof reaches a position overlapping the second-group-lens barrel 21, provided in the cam barrel 61, when seen in the direction of the optical axis A, and the other axial-direction end thereof reaches a position at which the optical filter 7 is held. The zoom body 64 also holds the fixed barrel 62 on the object side thereof in the direction of the optical axis A. The zoom body 64 also holds a train of gears included in a drive mechanism described separately below.

In FIGS. 1 and 6, a dimension X denotes the smallest thickness of the back wall of the zoom body 64 at a position to the rear (a side opposite the object side) of the fixed barrel 62, the cam barrel 61, and the prism 6 in the direction of the optical axis A, the prism 6 in this state being at a position before moving toward the image pickup device 8. Furthermore, a dimension Y denotes a distance from the outer surface (a surface on the side opposite the object side) of the back wall of the zoom body 64 to the holding member 60 holding the prism 6. Considering the smallest thickness of the zoom body 64, the clearance from the holding member 60, and so forth, a relationship of Y≧X holds.

In the present embodiment, the back wall of the zoom body 64 has a through hole 64*a* into which the second lens unit 20 is retractable in the direction of the optical axis A. Therefore, a retraction space provided to the rear of the first lens unit 10 and the second lens unit 20 when the holding member 60 holding the prism 6 retracts toward the image pickup device 8 is combined with a space corresponding to the dimension Y and defined by the through hole 64*a*, whereby a housing space is provided. The second lens unit 20 and the first lens unit 10 retract along the optical axis A and are housed in the housing space.

As illustrated in FIG. 16, the second-group-lens barrel 21 has notches 21*a* and 21*b*, as clearance grooves, in portions thereof overlapping the guide shafts 86 and 87 so as not to interfere with the guide shafts 86 and 87 when the second lens unit 20 retracts along the optical axis A.

Thus, when the lens barrel is in a retracted state, the second group lens 2 is housed at a position between the guide shafts 86 and 87, with a surface R2 thereof being on the rear side with respect to the guide shafts 86 and 87 by a dimension Z in the direction of the optical axis A.

In the above state, as illustrated in FIG. 9, the stepping motor 91 that drives the blades 94 and 95 of the stop/shutter 9 to open and close resides below the prism 6 and extends parallel to the optical axis B such that the position thereof in the direction of the optical axis B coincides with that of the prism 6, with the entirety thereof overlapping the prism 6.

Fixed Barrel 62, Cam Barrel 61, and Straight-Movement-Guide Barrel 63

Figure 19:
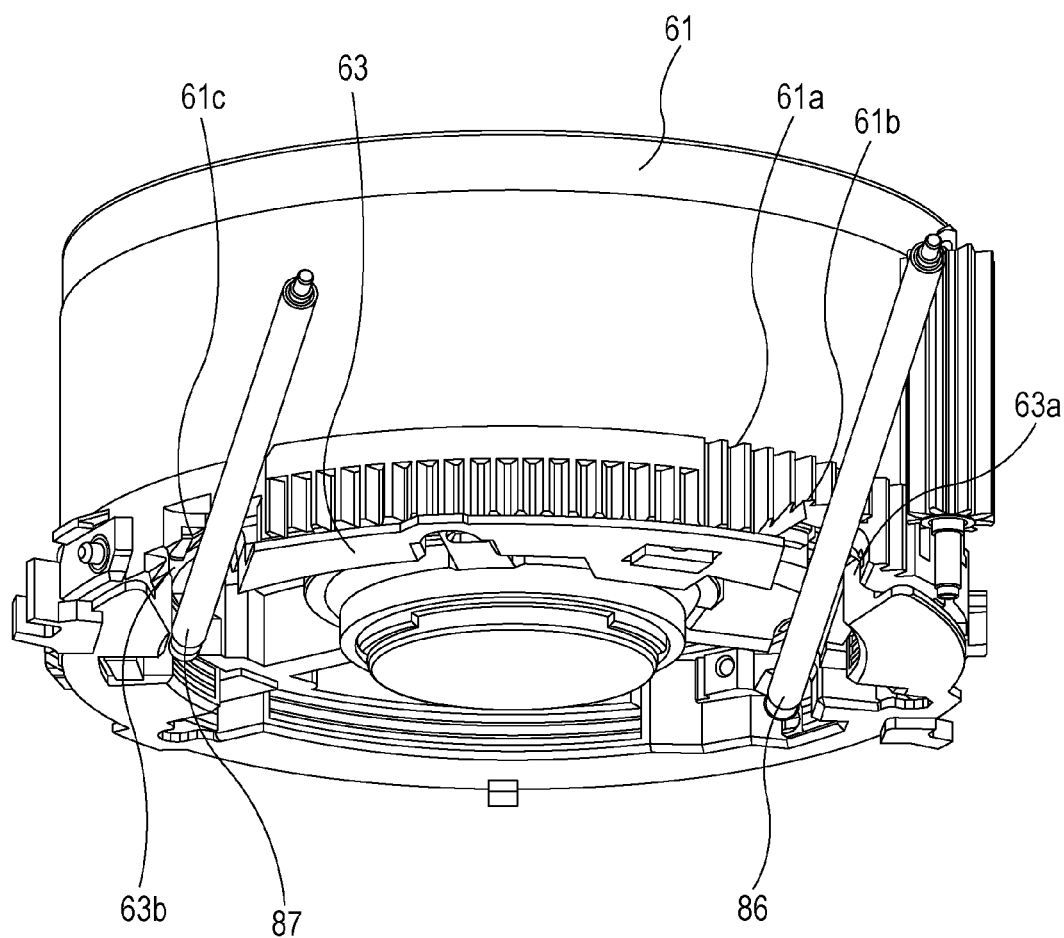
FIG. 19 is a perspective view illustrating a part of the lens barrel at the retracted position.

The fixed barrel 62, the cam barrel 61, and the straight-movement-guide barrel 63 will now be described. FIG. 19 is a perspective view illustrating a part of the lens barrel at the retracted position. The fixed barrel 62 has on the inner periphery thereof a plurality of cam grooves 62*a* (see FIG. 12) with which respective cam pins (not illustrated) provided on the outer periphery of the cam barrel 61 engage in a cam manner. The cam grooves 62*a* are provided at substantially regular intervals in the circumferential direction. The cam barrel 61 has on the outer periphery thereof a gear portion 61*a* that meshes with a driving gear 68 described separately below. The cam barrel 61 is driven to rotate with a driving force transmitted thereto from the driving gear 68. The cam barrel 61 also has notches 61*b* and 61*c* (see FIG. 19) on an image-plane side (rear side) thereof in the direction of the optical axis A. In this state, a cam action realized by the cam grooves 62*a* of the fixed barrel 62 and the cam pins of the cam barrel 61 causes the cam barrel 61 to advance or retract along the optical axis A. The cam barrel 61 thus advanceable and retractable along the optical axis A also has on the inner periphery thereof a first-group cam groove and a second-group cam groove (not illustrated).

As described above, the cam barrel 61 has the notches 61*b* and 61*c* (see FIG. 19) on the image plane side (rear side) thereof in the direction of the optical axis A. Therefore, when the cam barrel 61 moves from the wide-angle position illustrated in FIG. 1 toward the image plane side (rear side) in the direction of the optical axis A, the guide shafts 86 and 87 advance into the notches 61*b* and 61*c*, respectively. Thus, the cam barrel 61 is movable to the retracted position illustrated in FIGS. 8 and 19 without interfering with the guide shafts 86 and 87.

The straight-movement-guide barrel 63 is provided on the inner peripheral side of the cam barrel 61 and is movable in the direction of the optical axis A together with the cam barrel 61. The straight-movement-guide barrel 63, as a straight-movement-guide member, has notches 63*a* and 63*b* (see FIG. 19) on the image plane side (rear side) thereof in the direction of the optical axis A. When the straight-movement-guide barrel 63 moves from the wide-angle position illustrated in FIG. 1 toward the image plane side (rear side) in the direction of the optical axis A, the guide shafts 86 and 87 advance into the notches 63*a* and 63*b*, respectively. Therefore, the straight-movement-guide barrel 63 is movable to the retracted position illustrated in FIGS. 8 and 19 without interfering with the guide shafts 86 and 87. The first lens unit 10 is provided on the inner peripheral side of the cam barrel 61 and the straight-movement-guide barrel 63. A cam pin (not illustrated) provided on the outer periphery of the first-group-lens barrel 11 of the first lens unit 10 engages with the first-group cam groove of the cam barrel 61 in a cam manner. The straight-movement-guide barrel 63 has on the outer periphery thereof a straight-movement groove (not illustrated) extending in the direction of the optical axis A. When a projection (not illustrated) provided on the inner periphery of the first-group-lens barrel 11 engages with the straight-movement groove, the rotation of the first-group-lens barrel 11 about the optical axis A is stopped.

The second lens unit 20 is provided on the inner peripheral side of the straight-movement-guide barrel 63. In the second lens unit 20, as in the first lens unit 10, a cam pin (not illustrated) provided on the second-group-lens barrel 21 engages with the second-group cam groove of the cam barrel 61 in a cam manner. The straight-movement-guide barrel 63 also has a through groove (not illustrated) extending in the direction of the optical axis A. When an engaging portion (not illustrated) provided at the base of the cam pin of the second-group-lens barrel 21 engages with the through groove, the movement of the second-group-lens barrel 21 in the direction of rotation is stopped.

When the cam barrel 61 rotates, a cam action is realized by the first-group cam groove of the cam barrel 61 and the cam pin of the first-group-lens barrel 11, whereby the first-group-lens barrel 11 advances or retracts along the optical axis A relative to the cam barrel 61 such that the projection of the first-group-lens barrel 11 slides along the straight-movement groove of the straight-movement-guide barrel 63 in the direction of the optical axis A. Therefore, when the cam barrel 61 advances or retracts along the optical axis A relative to the fixed barrel 62, the first-group-lens barrel 11 advances or retracts along the optical axis A relative to the cam barrel 61, and the first group lens 1 moves between the retracted position and the image-taking position. Likewise, the second group lens 2 moves between the retracted position and the image-taking position.

Mechanism that Drives Cam Barrel 61 and Prism 6

Figure 10:
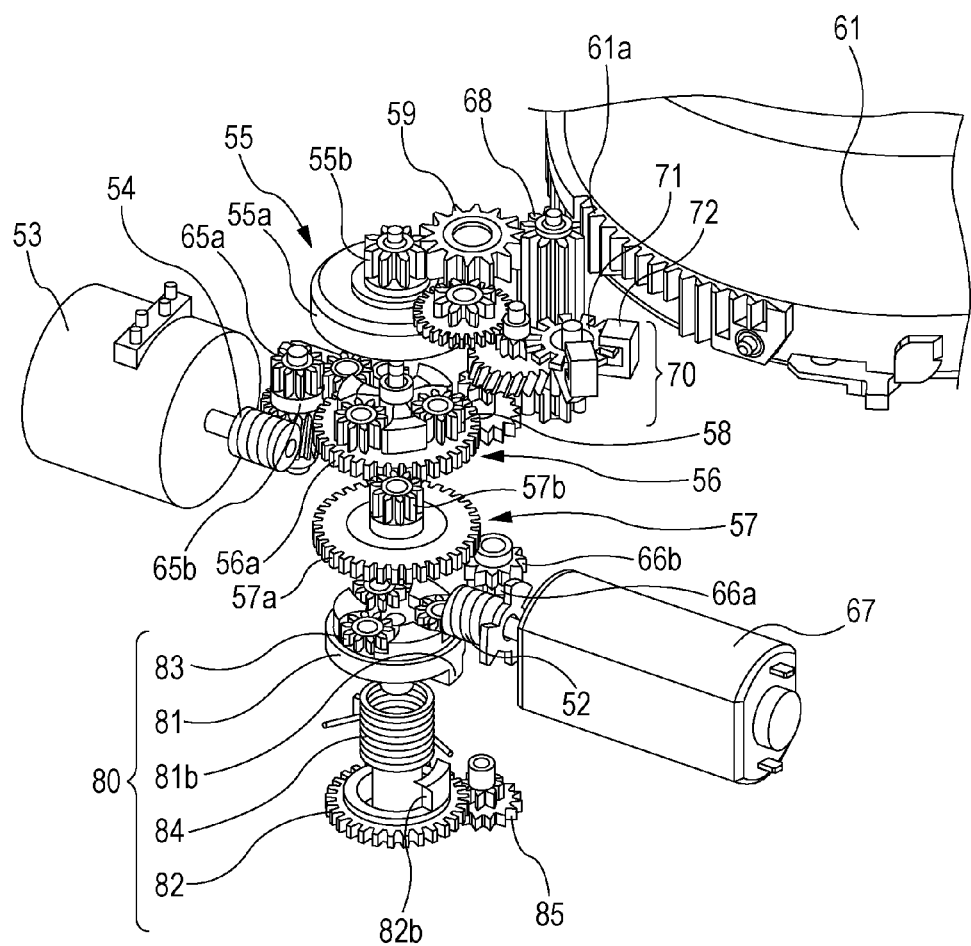
FIG. 10 is a partially exploded perspective view of a mechanism that drives a cam barrel and a prism.

Referring now to FIGS. 10 to 14, a mechanism that drives the cam barrel 61 and the prism 6 will be described. FIG. 10 is a partially exploded perspective view of a mechanism that drives the cam barrel 61 and the prism 6.

Figure 14:
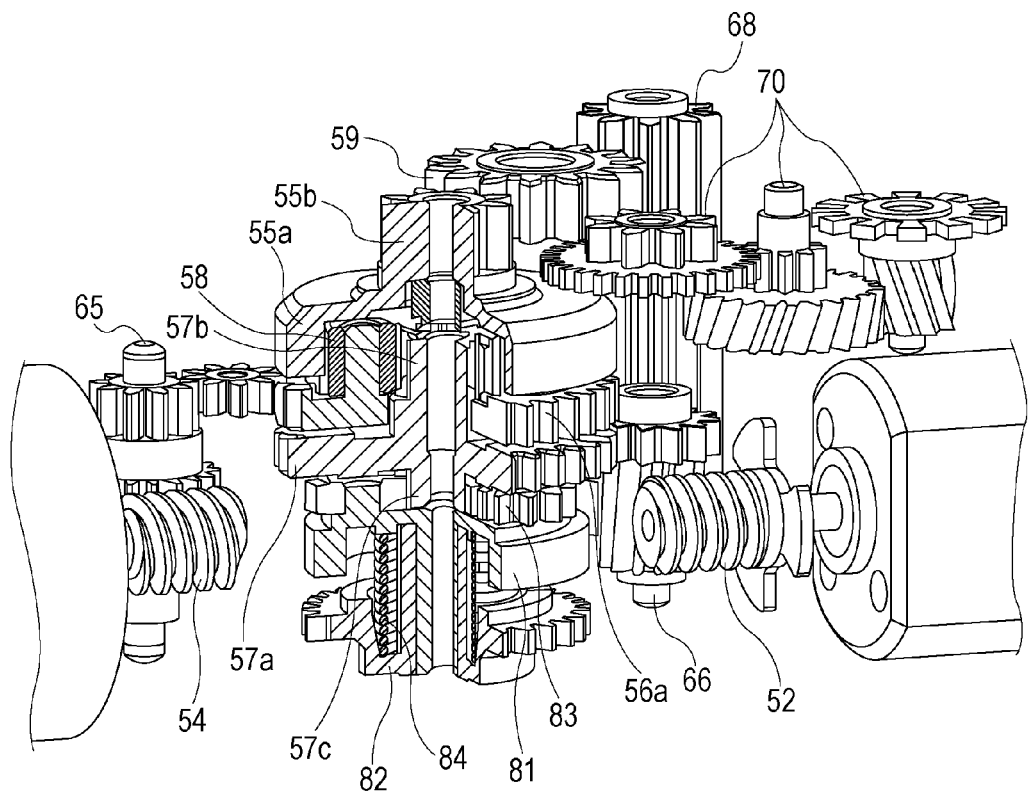
FIG. 14 is a partially cutaway perspective view of the mechanism that drives the cam barrel and the prism.

In FIGS. 10 and 14, a retracted-position/wide-angle-position (RW) motor 67 is a drive source that moves the first lens unit 10 and the second lens unit 20 between the retracted position and the wide-angle position. A telephoto-position/wide-angle-position (TW) motor 53 is a drive source that moves the first lens unit 10 and the second lens unit 20 between the telephoto position and the wide-angle position. The RW motor 67 and the TW motor 53 are each provided such that the axis of a motor shaft thereof extends in the direction of the optical axis B with the motor shaft oriented toward the inner side in the radial direction of the cam barrel 61. The TW motor 53 is provided on the object side with respect to the RW motor 67. The motor shaft of the RW motor 67 has a worm gear 52 press-fitted thereon. The motor shaft of the TW motor 53 has a worm gear 54 press-fitted thereon.

A zoom ring gear 55, a zoom carrier gear 56, and a sun gear 57 are provided between the worm gear 54 and the worm gear 52 coaxially in the direction parallel to the optical axis A in that order from the object side (the upper side of FIGS. 10 and 14).

The sun gear 57 includes three sun gears 57a to 57c, which are spur gears. A gear 66b meshes with the sun gear 57a and also meshes with the worm gear 52 with a helical gear 66a interposed therebetween.

The zoom carrier gear 56 includes a gear portion 56a and three shaft portions projecting from a surface of the gear portion 56a facing toward the object side. The shaft portions are provided at substantially regular intervals in the circumferential direction and have respective zoom planetary gears 58 rotatably supported thereon. The gear portion 56a meshes with a spur gear 65a. The spur gear 65a meshes with the worm gear 54 with a helical gear 65b interposed therebetween. The zoom planetary gears 58 mesh with the sun gear 57b. The zoom ring gear 55 includes an internal gear 55a and an external gear 55b. The internal gear 55a meshes with the zoom planetary gears 58. The external gear 55b meshes with an idler gear 59. The idler gear 59 meshes with the driving gear 68. The driving gear 68 meshes with the gear portion 61a of the cam barrel 61.

A prism-driving unit 80 will now be described. The prism-driving unit 80 is provided below the sun gear 57 and includes a prism carrier 81, a torsion spring 84, and a prism delay gear 82 that are provided in that order from the object side and coaxially with the sun gear 57. The prism delay gear 82 is rotatably supported on the prism carrier 81.

The prism carrier 81 has three shaft portions projecting on a surface thereof facing toward the object side. The shaft portions are provided at substantially regular intervals in the circumferential direction and have respective prism planetary gears 83 rotatably supported thereon. The prism planetary gears 83 mesh with the sun gear 57c and an internal gear fixed to a gear base plate (not illustrated).

The prism delay gear 82 meshes at a gear portion thereof with a prism-driving gear 85. The prism carrier 81 and the prism delay gear 82 have respective catch portions 81b and 82b. The catch portions 81b and 82b extend toward each other. The catch portion 81b is provided on the inner side in the radial direction with respect to the catch portion 82b (see FIGS. 13A to 13C).

The torsion spring 84 includes a coil portion and two arm portions 84a and 84b extending from two axial-direction ends of the coil portion toward the outer side in the radial direction. The two arm portions 84a and 84b are caught by the catch portion 82b of the prism delay gear 82 and the catch portion 81b of the prism carrier 81, respectively. At the time of assembly, the torsion spring 84 is pre-charged such that the two arm portions 84a and 84b are caught by the respective catch portions 82b and 81b that are oriented in phase with each other (see FIG. 13B).

In this state, when the prism carrier 81 is rotated with the prism delay gear 82 being allowed to rotate, the prism carrier 81, the prism delay gear 82, and the torsion spring 84 rotate together. Meanwhile, when the prism carrier 81 is rotated with the prism delay gear 82 being prevented from rotating, only the prism carrier 81 rotates and the torsion spring 84 is overcharged.

Holding Member 60 and Part of Prism-Driving Unit 80

Figure 11:
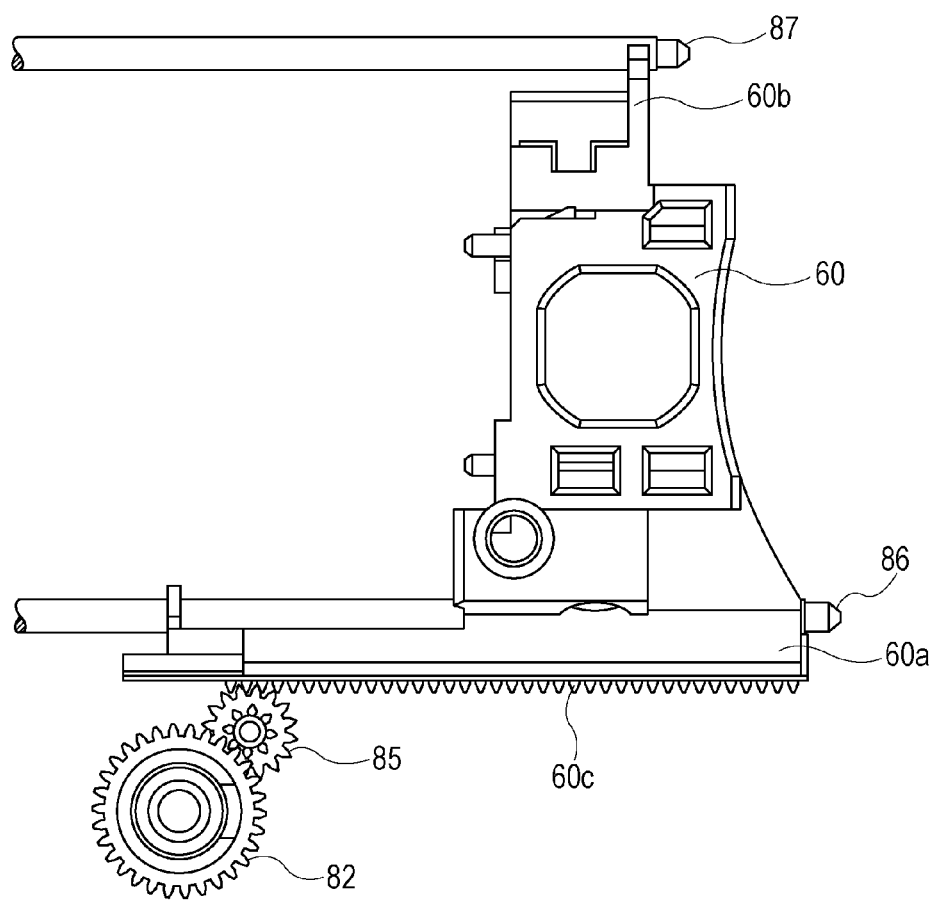
FIG. 11 is a plan view of a holding member that holds the prism and a part of a prism-driving unit.

FIG. 11 is a plan view illustrating the holding member 60 that holds the prism 6 and a part of the prism-driving unit 80.

As illustrated in FIG. 11, the holding member 60 includes engaging portions 60a and 60b that movably engage with the two respective guide shafts 86 and 87 as guide members extending parallel to each other in the direction of the optical axis B. The engaging portion 60a has a rack 60c. The rack 60c meshes with the prism-driving gear 85. Therefore, when the prism-driving gear 85 rotates, the holding member 60 and the prism 6 together advance or retract along the optical axis B. The guide shafts 86 and 87 with which the holding member 60 engages extend into the cam barrel 61 and the straight-movement-guide barrel 63 when seen from the object side of the optical axis A. This is because, in an image-taking state, the prism 6 needs to cause the light from the object traveling in the direction of the optical axis A to be refracted in the direction of the optical axis B.

Operations of Cam Barrel 61 and Prism 6

Referring back to FIG. 10, operations of the cam barrel 61 and the prism 6 will be described.

When the RW motor 67 is driven while the TW motor 53 is stopped, a driving force is transmitted from the RW motor 67 to the sun gear 57, whereby the sun gear 57 rotates, whereas the zoom carrier gear 56 connected to the TW motor 53 is stopped. Therefore, the zoom planetary gears 58 do not undergo orbital revolution but only rotate on the respective axes thereof.

For example, supposing that the sun gear 57b has nine teeth, the zoom planetary gears 58 each have ten teeth, and the internal gear 55a of the zoom ring gear 55 has thirty teeth, the rotation of the sun gear 57 is transmitted to the zoom ring gear 55 at a reduced speed of 1/3.33 of the original. The rotation of the external gear 55b is transmitted to the driving gear 68 via the idler gear 59, and the rotation of the driving gear 68 is transmitted to the gear portion 61a of the cam barrel 61, whereby the cam barrel 61 is driven to rotate.

The direction of rotation of the zoom ring gear 55 is opposite to that of the sun gear 57. In this case, the rotation of the sun gear 57 is transmitted to the prism carrier 81 via the prism planetary gears 83. Here, if the holding member 60 is movable in the direction of the optical axis B, the torsion spring 84 and the prism delay gear 82 rotate together with the prism carrier 81, thereby causing the holding member 60 to advance or retract in the direction of the optical axis B. Meanwhile, if the holding member 60 is prevented from moving in the direction of the optical axis B, the prism delay gear 82 is not allowed to rotate. Therefore, the torsion spring 84 absorbs the rotation of the prism carrier 81 while being overcharged.

When the TW motor 53 is driven while the RW motor 67 is stopped, the sun gear 57 connected to the RW motor 67 is stopped, whereas the zoom carrier gear 56 connected to the TW motor 53 rotates. Therefore, the zoom planetary gears 58 undergo orbital revolution while rotating on the respective axes thereof. For example, supposing that the sun gear 57b has nine teeth, the zoom planetary gears 58 each have ten teeth, and the internal gear 55a of the zoom ring gear 55 has thirty teeth, the rotation of the zoom carrier gear 56 is transmitted to the zoom ring gear 55 at an increased speed of 1.3 times the original. Thus, the cam barrel 61 is driven to rotate.

In this case, the direction of rotation of the zoom ring gear 55 is the same as that of the zoom carrier gear 56. Furthermore, since the sun gear 57 is stopped in this state, the prism carrier 81 is also stopped. Therefore, the driving force is not transmitted to the holding member 60.

When the RW motor 67 and the TW motor 53 are both driven, a combined number of revolutions is transmitted to the zoom ring gear 55. For example, a case where the sun gear 57 is rotated clockwise at 1 rpm and the zoom carrier gear 56 is rotated clockwise at 1 rpm will be considered. The number of revolutions of the zoom ring gear 55 to be realized by the sun gear 57 is 0.3 rpm in the counterclockwise direction. The number of revolutions of the zoom ring gear 55 to be realized by the zoom carrier gear 56 is 1.3 rpm in the clockwise direction. Hence, combining the two, the zoom ring gear 55 rotates clockwise at 1 rpm.

A case where the sun gear 57 is rotated clockwise at 1.3 rpm and the zoom carrier gear 56 is rotated clockwise at 0.3 rpm will now be considered. The number of revolutions of the zoom ring gear 55 to be realized by the sun gear 57 is 0.39 rpm in the counterclockwise direction. The number of revolutions of the zoom ring gear 55 to be realized by the zoom carrier gear 56 is 0.39 rpm in the clockwise direction. Combining the two, the zoom ring gear 55 is stopped.

The above description shows that, if the numbers of revolutions and directions of rotation of the RW motor 67 and the TW motor 53 are selected appropriately, the prism 6 is drivable while the cam barrel 61 is maintained stationary. The above description also shows that the speed reduction ratio of the train of gears connected to the RW motor 67 is large, whereas the speed reduction ratio of the train of gears connected to the TW motor 53 is small. This aspect will be described separately below.

Operations of Moving Prism 6 to Image-Taking Position and to Retracted Position Referring now to FIG. 12 and FIGS. 13A to 13C, an operation of moving the prism 6 to the image-taking position by moving the first lens unit 10 and the second lens unit 20 forward in the direction of the optical axis A will be described.

Figure 12:
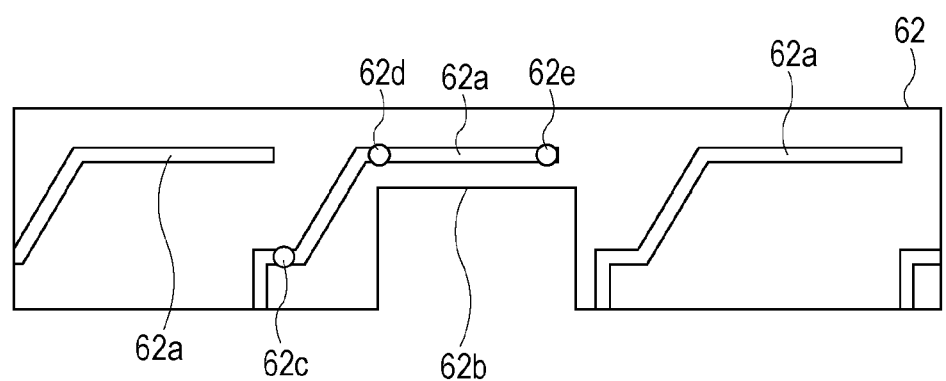
FIG. 12 is a development illustrating the inner side of a fixed barrel.

FIG. 12 is a development illustrating the inner side of the fixed barrel 62. As illustrated in FIG. 12, the fixed barrel 62 has on the inner periphery thereof the cam grooves 62a with which the cam pins provided on the outer periphery of the cam barrel 61 engage in a cam manner. The cam grooves 62a are provided at substantially regular intervals in the circumferential direction. The fixed barrel 62 also has a notch 62b in a rear end portion thereof. When the holding member 60 holding the prism 6 advances or retracts in the direction of the optical axis B, the holding member 60 passes through the notch 62b.

Furthermore, the cam barrel 61 and the straight-movement-guide barrel 63 have the notches 61b and 61c and 63a and 63b (see FIG. 19), which are clearance grooves, in respective portions thereof overlapping the guide shafts 86 and 87 so as to avoid the interference with the guide shafts 86 and 87 when the cam barrel 61 and the straight-movement-guide barrel 63 retract in the direction of the optical axis A to the retracted position. This is because the guide shafts 86 and 87 engaging with the holding member 60 extend into the cam barrel 61 and the straight-movement-guide barrel 63 when seen from the object side of the optical axis A so as to allow the prism 6 to move to the image-taking position. Therefore, even if the guide shafts 86 and 87 engaging with the holding member 60 extend into the cam barrel 61 and the straight-movement-guide barrel 63 when seen from the object side of the optical axis A, the length of the zoom lens in the retracted state is reduced in the direction of the optical axis A because of the presence of the notches 61b, 61c, 63a, and 63b as clearance grooves.

The cam barrel 61 and the straight-movement-guide barrel 63 are exemplary driven barrels in the present invention.

Figure 13A:
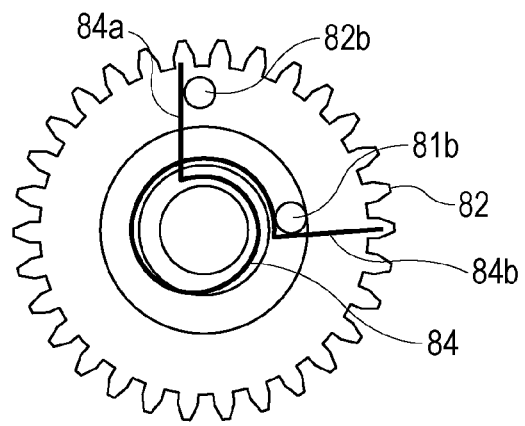
FIGS. 13A to 13C illustrate the phase relationship between a prism carrier and a prism delay gear and the charged amount of a torsion spring.
Figure 13B:
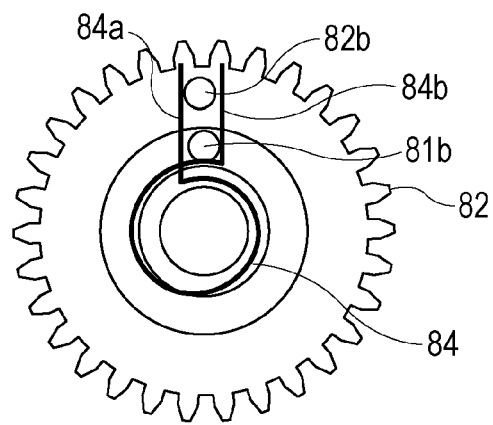
Figure 13C:
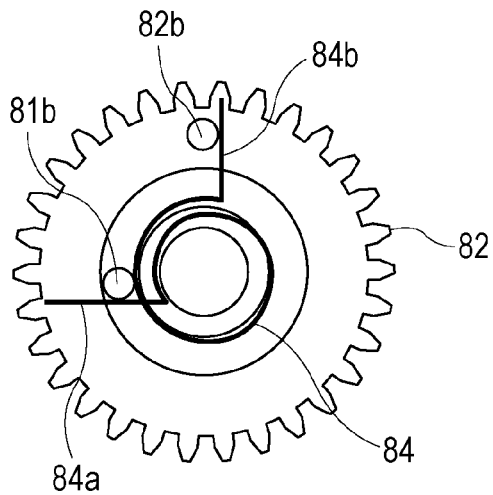

Phase Relationship Between Prism Carrier 81 and Prism Delay Gear 82 and Other Factors FIGS. 13A to 13C illustrate the phase relationship between the prism carrier 81 and the prism delay gear 82 and the charged amount of the torsion spring 84.

When the lens barrel is at the retracted position, each of the cam pins of the cam barrel 61 is at a position 62c, illustrated in FIG. 12, of a corresponding one of the cam grooves 62a of the fixed barrel 62. The phase relationship between the prism carrier 81 and the prism delay gear 82 in this state is illustrated in FIG. 13A, in which the torsion spring 84 is overcharged. In this state, the holding member 60 is urged in a retracting direction (toward the image pickup device 8) along the optical axis B by a force charged in the torsion spring 84, whereas the movement thereof in the retracting direction is prevented by a mechanical end (not illustrated).

To bring the lens barrel into the image-taking state, the RW motor 67 is first rotated in such a direction as to move the cam barrel 61 forward. In this movement, each cam pin of the cam barrel 61 moves rightward in FIG. 12 in the corresponding cam groove 62a of the fixed barrel 62 and, in a lift section of the cam groove 62a, causes the first lens unit 10 and the second lens unit 20 to move forward along the optical axis A. During this forward movement, the prism carrier 81 also rotates in such a direction as to move the holding member 60 forward to the image-taking position, whereas the torsion spring 84, which is in the overcharged state, retains the prism delay gear 82 to be stopped. Therefore, the holding member 60 remains still at the retracted position.

When the cam barrel 61 moves forward in the direction of the optical axis A and a space that allows the holding member 60 to move to the image-taking position is provided, the catch portion 81b of the prism carrier 81 and the catch portion 82b of the prism delay gear 82 become in phase with each other as illustrated in FIG. 13B.

Furthermore, when the RW motor 67 is rotated in such a direction as to move the cam barrel 61 forward, each cam pin of the cam barrel 61 moves rightward in FIG. 12 in the corresponding cam groove 62a of the fixed barrel 62 and the holding member 60 moves toward the image-taking position.

When the cam barrel 61 reaches the wide-angle position, the TW motor 53 is driven in such a direction as to move the cam barrel 61 backward while the RW motor 67 is driven in such a direction as to move the cam barrel 61 forward. Thus, while the cam barrel 61 remains still at the wide-angle position, only the holding member 60 continues to move along the optical axis B toward the image-taking position.

When the holding member 60 reaches the image-taking position, the holding member 60 comes into contact with an image-taking-side stopper (not illustrated) and thus stops. When the holding member 60 stops, the prism delay gear 82 stops. In this state, when the RW motor 67 continues to be driven in such a direction as to move the cam barrel 61 forward, the prism carrier 81 continues to rotate in such a direction as to move the holding member 60 forward to the image-taking position, and the torsion spring 84 is overcharged.

By overcharging the torsion spring 84 to some extent, the torsion spring 84 acts such that the holding member 60 is urged toward the image-taking-side stopper. Thus, when an image is taken, the position and orientation of the holding member 60 are effectively stabilized.

When the torsion spring 84 is overcharged to a predetermined extent, the RW motor 67 and the TW motor 53 are stopped.

Through the above series of operations, the first lens unit 10, the second lens unit 20, and the prism 6 are brought to the respective wide-angle positions, whereby the lens barrel falls into the image-taking state. When the cam barrel 61 reaches the wide-angle position, each cam pin moves to a position 62d in the corresponding cam groove 62a of the fixed barrel 62. Subsequently, the third lens unit 30 and the fourth lens unit 40 are moved to the respective predetermined positions along the optical axis B.

To move the lens barrel from the wide-angle position to the retracted position, a series of operations reverse to the above series of operations are performed. First, the third lens unit 30 and the fourth lens unit 40 are retracted toward the image pickup device 8 along the optical axis B. Subsequently, while the TW motor 53 is driven in such a direction as to move the cam barrel 61 forward, the RW motor 67 is driven in such a direction as to move the cam barrel 61 backward. Thus, only the prism carrier 81 rotates in such a direction as to move the holding member 60 forward to the image-taking position, with the cam barrel 61 prevented from rotating.

Then, the prism carrier 81 rotates by an amount corresponding to the above-described overcharging of the torsion spring 84, and the catch portion 81b of the prism carrier 81 and the catch portion 82b of the prism delay gear 82 are brought into phase with each other. In this movement, the prism delay gear 82 rotates together with the prism carrier 81 and the torsion spring 84 in such a direction as to move the holding member 60 backward to the retracted position, whereby the holding member 60 moves in the retracting direction.

When the holding member 60 is moved toward the retracted position and a space allowing the cam barrel 61 to be housed therein is provided to the rear of the cam barrel 61, the TW motor 53 is stopped but only the RW motor 67 continues to be driven in such a direction as to move the cam barrel 61 backward, whereby the cam barrel 61 starts to move backward. When the holding member 60 reaches the retracted position, the holding member 60 comes into contact with a retracted-side mechanical end (not illustrated) and is stopped. Simultaneously, the prism delay gear 82 stops.

Since the RW motor 67 continues to be driven so as to move the cam barrel 61 backward to the retracted position, the prism carrier 81 continues to rotate in such a direction as to move the holding member 60 backward to the retracted position while overcharging the torsion spring 84. When the cam barrel 61 is housed at the retracted position and the first lens unit 10 and the second lens unit 20 are thus housed, the RW motor 67 is stopped.

To perform a zooming operation by moving the lens barrel between the wide-angle position and the telephoto position, only the TW motor 53 is driven. Thus, the first lens unit 10 and the second lens unit 20 are moved in the direction of the optical axis A, without moving the holding member 60 in the direction of the optical axis B. When the lens barrel is at the telephoto position, each cam pin of the cam barrel 61 is at a position 62e (see FIG. 12) in the corresponding cam groove 62a of the fixed barrel 62.

An effect provided when the speed reduction ratio of the train of gears connected to the RW motor 67 is large and the speed reduction ratio of the train of gears connected to the TW motor 53 is small as described above will now be described.

Basically, the load produced in driving the cam barrel 61 in a range from the retracted position to any position within an image-taking area is larger than the load produced in driving the cam barrel 61 in the image-taking area from the wide-angle position to the telephoto position. In the range from the retracted position to any position within the image-taking area, the angle of lift in the cam grooves 62a of the fixed barrel 62 is large, and a load produced in operating a lens barrier (not illustrated) is often added. Therefore, the torque of the motor needs to be increased by using a train of gears whose speed reduction ratio is large.

Meanwhile, in the image-taking area from the wide-angle position to the telephoto position, the number of revolutions of the motor needs to be suppressed to a low level so that noise generated in driving the lens is not recorded while an image such as a movie is being taken. In such a case, if a train of gears whose speed reduction ratio is large is used, the speed of rotation of the cam barrel becomes extremely slow.

In the present embodiment, in the range from the retracted position to any position within the image-taking area in which the load produced in driving the cam barrel 61 is large, the driving force of the RW motor 67 is transmitted to the cam barrel 61 via a train of gears whose speed reduction ratio is large, whereby the cam barrel 61 is driven. Furthermore, in the image-taking area from the wide-angle position to the telephoto position, the driving force of the TW motor 53 is transmitted to the cam barrel 61 via a train of gears whose speed reduction ratio is small, whereby the cam barrel 61 is driven. Therefore, while a movie is being taken, even if the TW motor 53 is rotated at a low speed so that the noise generated in driving the motor is suppressed, a zooming operation at a comfortable speed is realized.

Furthermore, in the present embodiment, the RW motor 67 and the TW motor 53 may be of different types of motors. For example, a direct-current (DC) motor may be employed as the RW motor 67, and a stepping motor may be employed as the TW motor 53. A stepping motor is stably controllable at a low speed, compared with a DC motor, and is therefore suitable for low-speed driving performed while a movie is being taken.

Moreover, there are provided a choice of stepping motors employing different driving methods including microstep drive and two-phase-excitation drive. If microstep drive is employed, a more silent driving operation is realized. If two-phase drive is employed, a higher-torque driving operation is realized. Therefore, for example, microstep drive can be employed in a zooming operation performed while a movie is being taken and silence is therefore desired, whereas two-phase drive can be employed in a zooming operation performed when a still image is taken.

Furthermore, the trains of gears of the drive mechanism according to the present embodiment are configured such that the cam barrel 61 is drivable over the entirety of the range from the retracted position to the telephoto position no matter which of the RW motor 67 and the TW motor 53 is driven. Therefore, if a high-speed zooming operation is desired, the RW motor 67 is used; if a low-speed zooming operation is desired, the TW motor 53 is used. Thus, the RW motor 67 and the TW motor 53 are selectively usable.

Pulse Gear Train 70

Referring back to FIG. 10, a pulse gear train 70 with which the positions of the first lens unit 10 and the second lens unit 20 in the direction of the optical axis A are detected will now be described.

As illustrated in FIG. 10, the pulse gear train 70 is connected to the zoom ring gear 55, which is the output gear of a train of planetary gears, and to the idler gear 59. The pulse gear train 70 includes a pulse plate 71 on the most downstream side. The pulse plate 71 has a plurality of blades. By counting the number of passages of the blades with a photointerrupter 72, the amount of rotation of the cam barrel 61 is detected. The speed-increasing ratio of the pulse gear train 70 and the number of blades of the pulse plate 71 are determined such that a desired resolution that is determined by optical design is obtained.

In a general case where the transmission of the driving force of a motor is realized by using a train of gears, there is essentially no loss in the amount of rotation due to slipping, or the like. Therefore, the amount of rotation of the cam barrel with respect to the amount of rotation of the motor is determined linearly in accordance with the speed reduction ratio. Practically, however, the amount of rotation of the cam barrel with respect to the amount of rotation of the motor may vary because of backlashes and meshing errors of the gears.

Nevertheless, in a related-art lens barrel in which one cam barrel is driven by one motor, once gears are assembled, the meshing relationship among the gears does not change even if the motor is driven. That is, since the combinations of the gears that mesh with each other are always the same, the state of variation in the amount of rotation of the cam barrel with respect to the amount of rotation of the motor is constant. Therefore, even if the amount of rotation of the cam barrel is calculated from the amount of rotation of the motor, the error from the actual amount of rotation is small.

In contrast, in a case where one cam barrel is driven by combining the amounts of rotation of two motors using a train of planetary gears as in the present embodiment, when one of the motors is rotated, the meshing relationship between the other motor and the zoom ring gear (55) changes.

That is, every time the power of the camera is turned on, the combinations of teeth that mesh with each other change, and the state of variation in the amount of rotation of the cam barrel with respect to the amounts of rotation of the motors also changes. Therefore, if the amount of rotation of the cam barrel is calculated from the amounts of rotation of the motors, there may be a significant error from the actual amount of rotation.

In the present embodiment, however, since the pulse gear train 70 branches from the idler gear 59 provided between the cam barrel 61 and the zoom ring gear 55, which is the output gear of the train of planetary gears, the meshing relationship between the pulse gear train 70 and the gear portion 61a of the cam barrel 61 is constant. Therefore, the amount of rotation of the cam barrel 61 is detected with an error of substantially the same level as that of the related-art lens barrel.

As described thus far, according to the present embodiment, since the back wall of the zoom body 64 has the through hole 64a, the space corresponding to the dimension Y (at least larger than a space corresponding to the dimension X) and defined by the through hole 64a is added to the retraction space provided to the rear of the first lens unit 10 and the second lens unit 20. Furthermore, the second-group-lens barrel 21, the cam barrel 61, and the straight-movement-guide barrel 63 have the notches 21a, 21b, 61b, 61c, 63a, and 63b (see FIG. 19) as clearance grooves for avoiding interference with the guide shafts 86 and 87 when the first lens unit 10 and the second lens unit 20 retract along the optical axis A. The notches 21a, 21b, 61b, 61c, 63a, and 63b of the second-group-lens barrel 21, the cam barrel 61, and the straight-movement-guide barrel 63 are provided at positions overlapping the guide shafts 86 and 87 when the lens is at the retracted position.

Thus, the retraction space for the first lens unit 10 and the second lens unit 20 provided along the optical axis A, which is the incoming optical axis, is increased, and the thickness of the digital camera with the lens barrel thereof in the retracted state is further reduced.

Positions of Drive Unit and Microphone

The position of a drive unit that drives the first to fifth lens units 10 to 50 and the position of a microphone will now be described.

Figure 17:
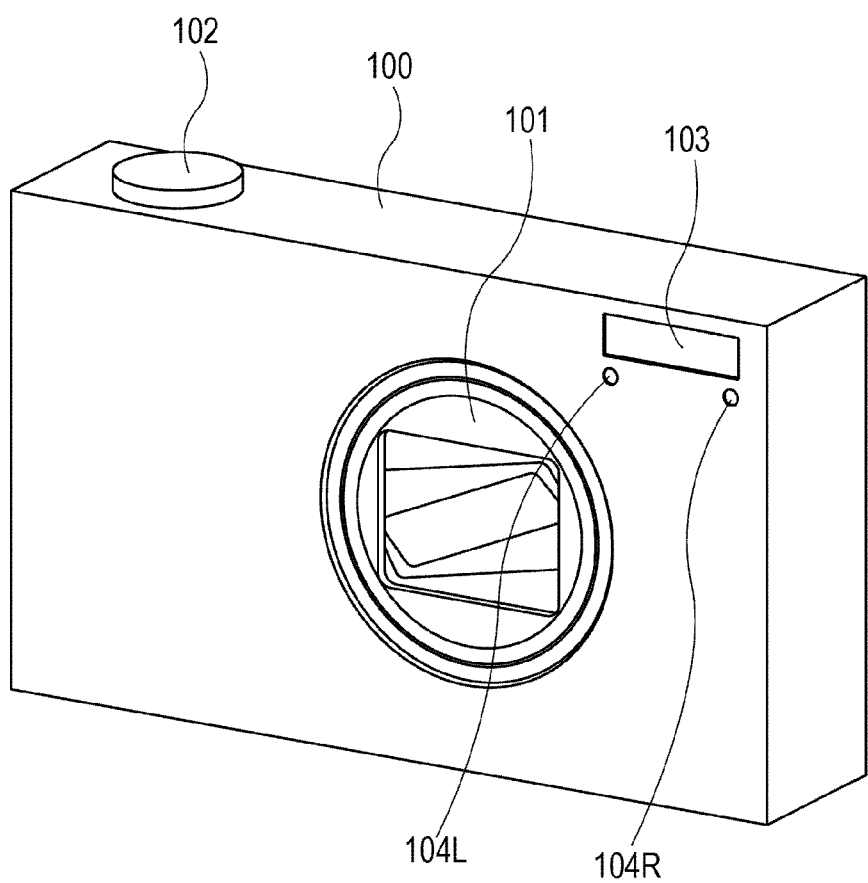
FIG. 17 is a perspective view of the image pickup apparatus with the lens barrel thereof at the retracted position and seen from the object side in the direction of the first optical axis.
Figure 20:
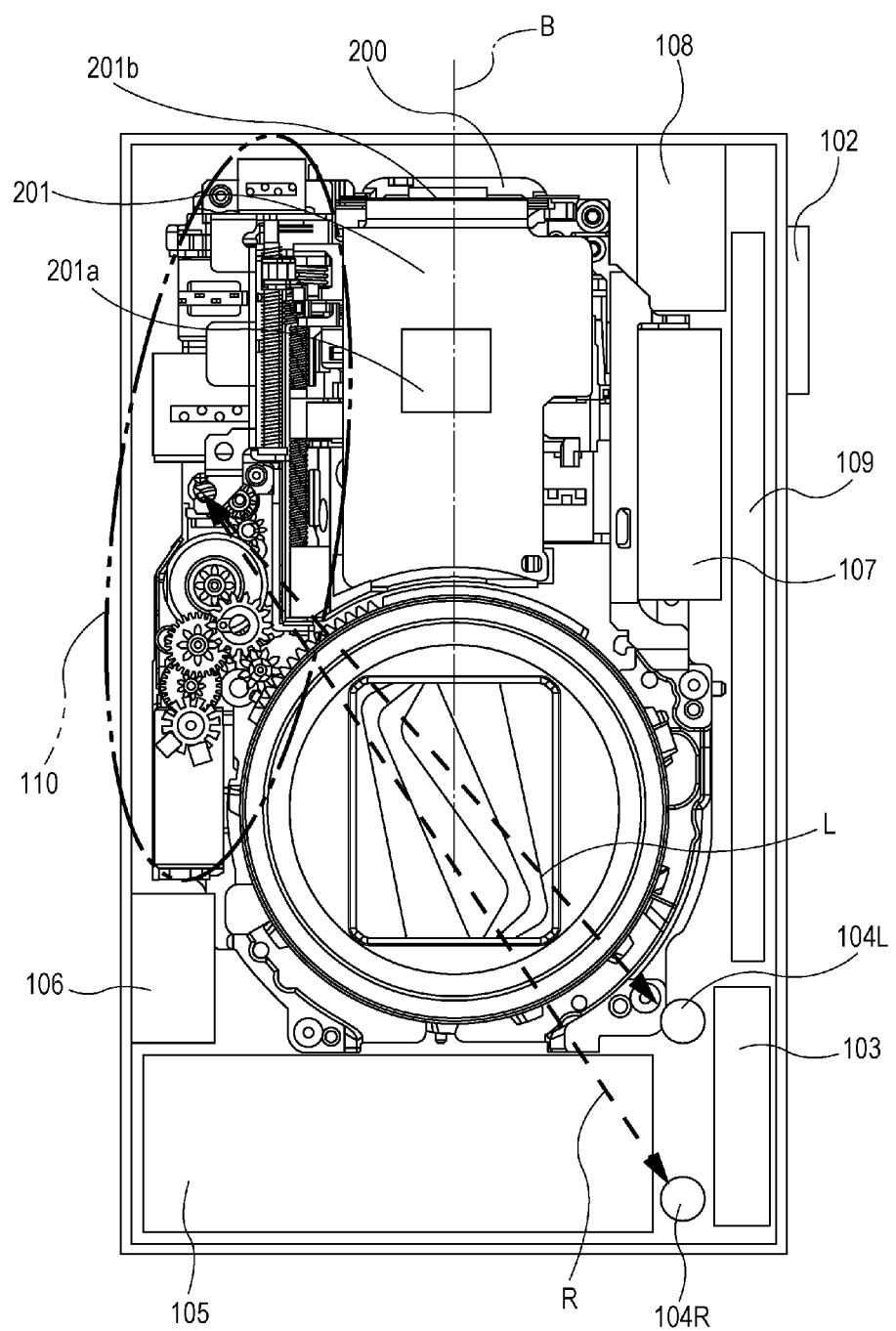
FIG. 20 is a sectional view of the image pickup apparatus taken in a direction perpendicular to the first optical axis, with the lens barrel thereof at the retracted position.

FIG. 17 is a perspective view of the digital camera, including a camera body 100, with lens barrel thereof at the retracted position and seen from the object side in the direction of the optical axis A. FIG. 20 is a sectional view of the digital camera taken in a direction perpendicular to the optical axis A, with the lens barrel thereof at the retracted position. In FIG. 17, the lens barrel is denoted by 101. FIG. 17 also illustrates a release switch 102, a strobe 103, and a stereo microphone 104 including a left-channel microphone 104L and a right-channel microphone 104R.

Sectional View of Digital Camera at Retracted Position Taken in Direction Perpendicular to Optical Axis A FIG. 20 is a sectional view of the digital camera taken in a direction perpendicular to the optical axis A, with the lens barrel thereof at the retracted position.

FIG. 20 illustrates a battery 105, a tripod-attaching screw 106, a main capacitor 107 for strobe illumination (of the strobe 103), a connector terminal 108 to which an external apparatus is to be connected, a circuit board 109 that controls electrical connections of the release switch 102 and so forth, and a zoom drive unit 110 that drives the first to fifth lens units 10 to 50 in the directions of the individual optical axes A and B in the zooming and focusing operations. The zoom drive unit 110 includes the TW motor 53, the train of gears from the worm gear 54 to the driving gear 68, the stepping motor 32, the gear 33, the gear 34, the stepping motor 42, and so forth. The zoom drive unit 110 is a source of noise that may be recorded when any of the lens units 10 to 50 is moved while a movie is being taken.

In FIG. 20, L denotes the distance between the left-channel microphone 104L and the zoom drive unit 110, and R denotes the distance between the right-channel microphone 104R and the zoom drive unit 110.

As illustrated in FIG. 20, the left-channel microphone 104L and the right-channel microphone 104R of the stereo microphone 104 are provided across the optical axis B from the zoom drive unit 110 and are arranged in a direction substantially parallel to the optical axis B. Furthermore, as illustrated in FIG. 20, the stereo microphone 104 is provided near an end on one side with respect to the optical axis A, and the main capacitor 107 is near an end on the other side with respect to the optical axis A. Therefore, the difference between the distance L from the zoom drive unit 110, which is the source of noise, to the left-channel microphone 104L and the distance R from the zoom drive unit 110 to the right-channel microphone 104R does not increase with increases in the distance L and the distance R in the camera body 100. Hence, the level of noise from the zoom drive unit 110 that may be recorded in the zooming or focusing operations performed while a movie is being taken is lowered, with no significant difference between the levels of noise received by the left and right channels. Consequently, if, for example, electrical noise-reduction processing is performed nonuniformly between the left and right channels, feeling of strangeness in the sounds produced by the left and right channels during a reproduction operation is reduced.

Furthermore, as illustrated in FIG. 20, the motors included in the zoom drive unit 110 are arranged along the optical axis B and between the optical axis B and the bottom surface of the camera body 100. The main capacitor 107 for strobe illumination is provided across the optical axis B from the zoom drive unit 110 and extends along the optical axis B such that the longitudinal direction thereof corresponds to the direction of the optical axis B.

Thus, since long and narrow components such as the zoom drive unit 110 and the main capacitor 107 are provided on opposite sides of the optical axis B, the space in the camera body 100 is efficiently used, and the size of the camera body 100 is reduced.

Attachment of Image Pickup Device 8

Referring now to FIG. 18 and FIGS. 20 to 24, the attachment of the image pickup device 8 will be described.

Figure 18:
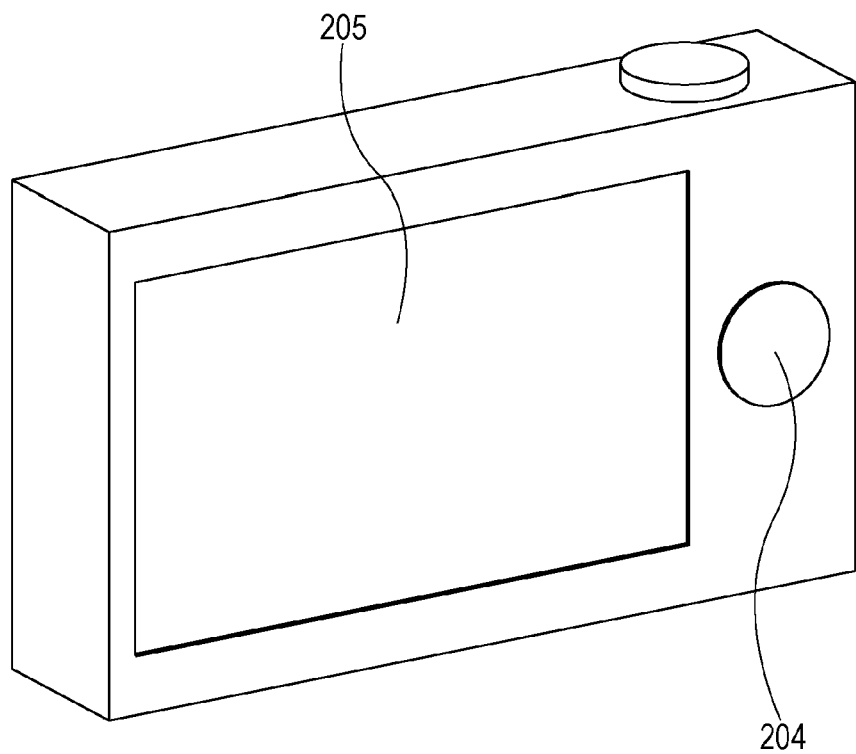
FIG. 18 is a perspective view of the image pickup apparatus seen from a photographer side in the direction of the first optical axis.
Figure 21:
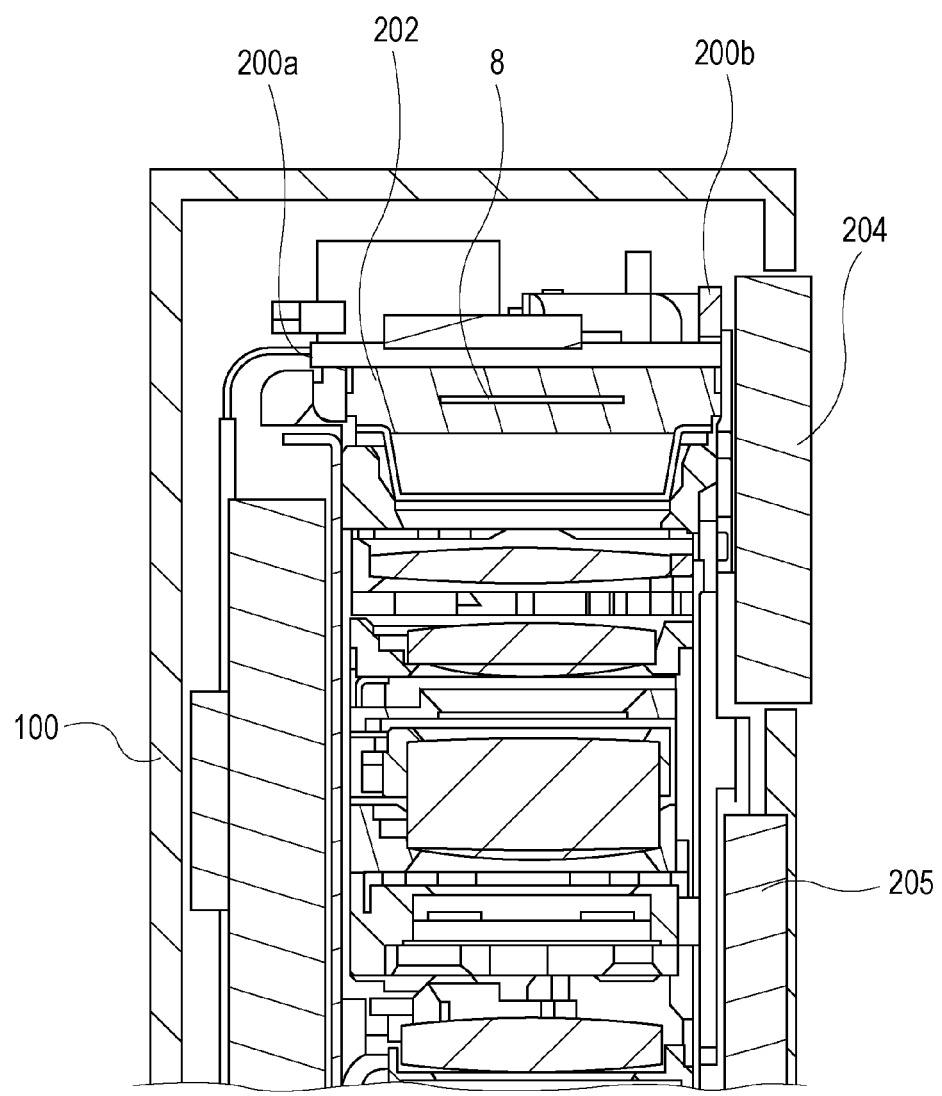
FIG. 21 is a sectional view illustrating a part of the image pickup apparatus with the lens barrel thereof at the retracted position.
Figure 22:
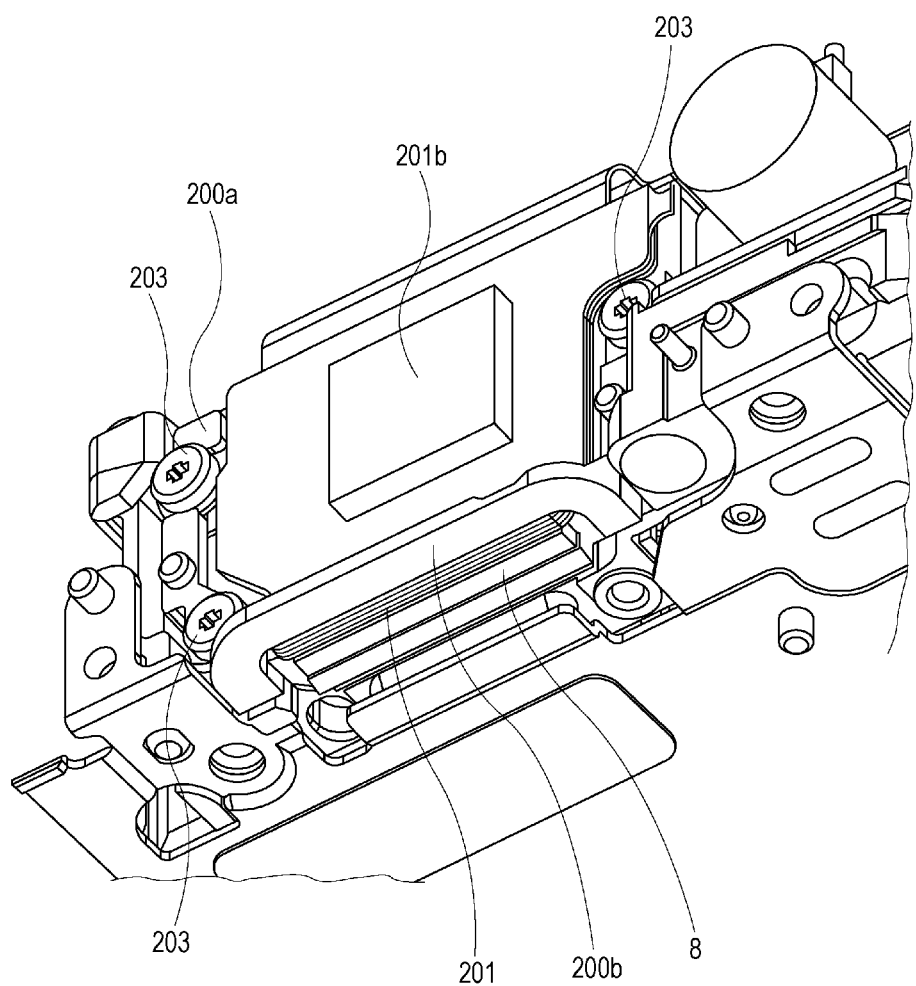
FIG. 22 is a perspective view illustrating a part of the image pickup apparatus including the image pickup device seen from a side opposite the object side in the direction of the second optical axis.
Figure 23:
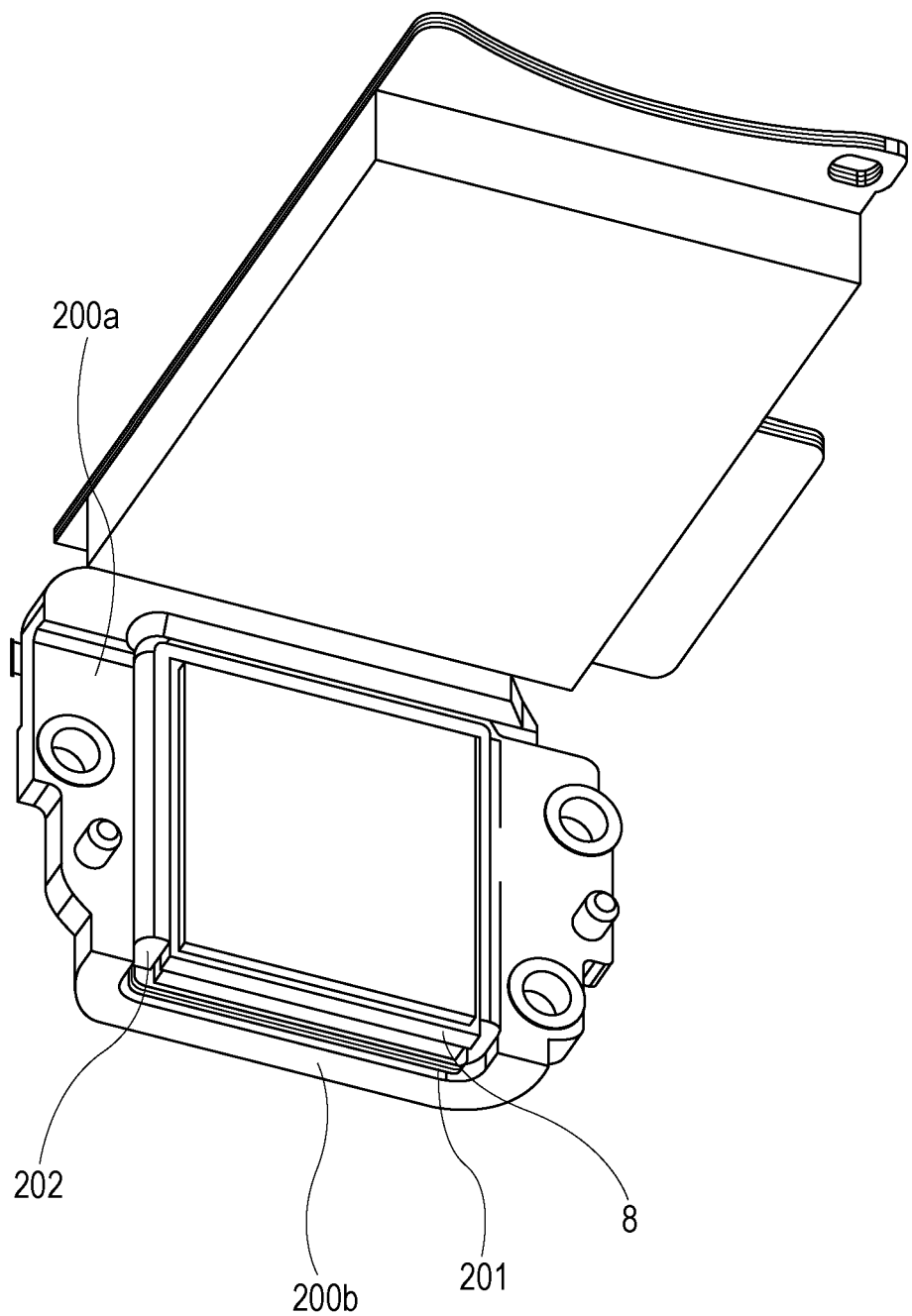
FIG. 23 is a perspective view illustrating the part of the image pickup apparatus including the image pickup device seen from the object side in the direction of the second optical axis.
Figure 24:
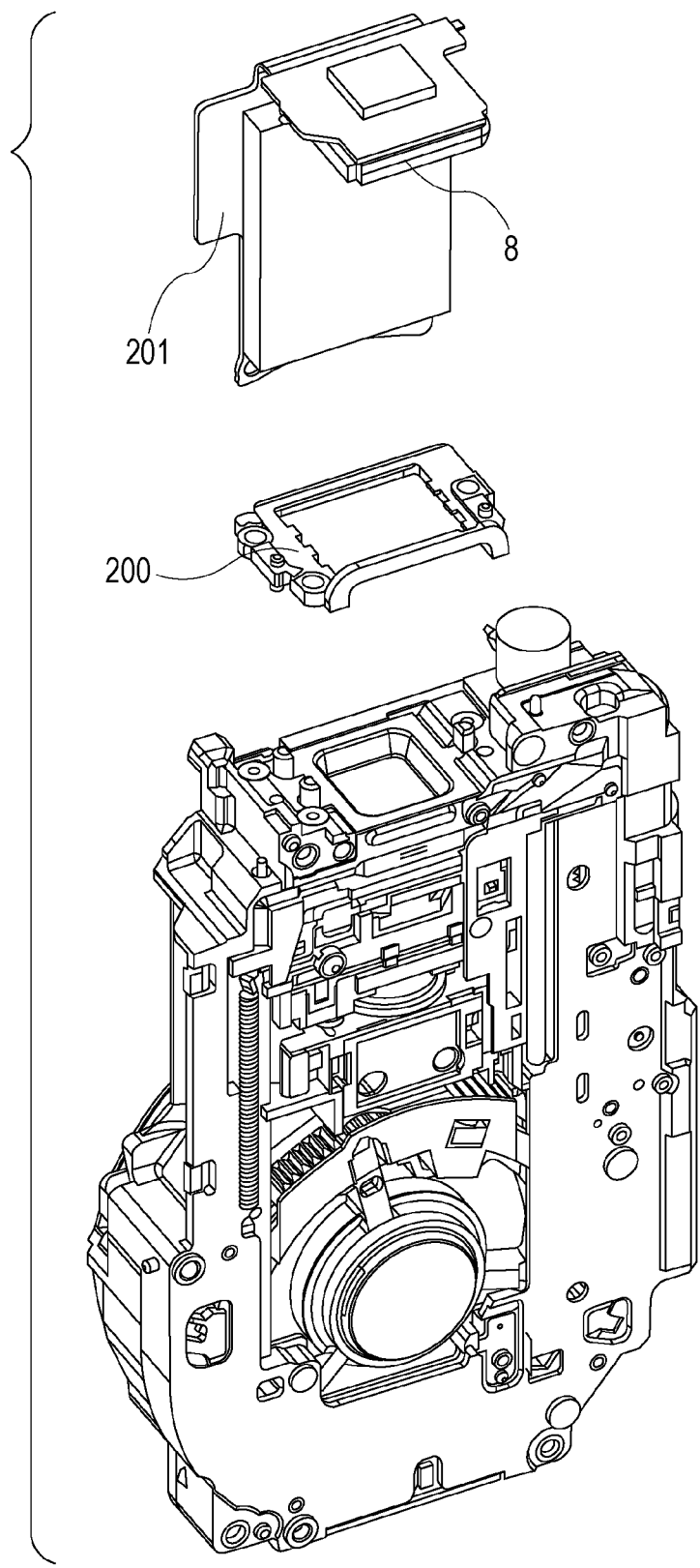
FIG. 24 is an exploded perspective view of the image pickup apparatus illustrating the image pickup device, a sensor plate, and an image pickup circuit board that are attached to the lens barrel.

FIG. 18 is a perspective view illustrating the digital camera seen from a photographer side in the direction of the optical axis A. FIG. 21 is a sectional view illustrating a part of the digital camera with the lens barrel thereof at the retracted position. FIG. 22 is a perspective view illustrating a part of the digital camera including the image pickup device 8 seen from a side opposite the object side in the direction of the optical axis B. FIG. 23 is a perspective view illustrating the part including the image pickup device 8 seen from the object side in the direction of the optical axis B. FIG. 24 is an exploded perspective view of the digital camera illustrating the image pickup device 8, a sensor plate 200, and an image pickup circuit board 201 that are attached to the lens barrel.

FIG. 18 illustrates an operation member 204 with which the photographer selects a function of the camera, and a liquid crystal panel 205 on which an image that has been taken is checked. Referring to FIGS. 20 to 24, the sensor plate 200 as an image-pickup-device-holding member holds the image pickup device 8. The image pickup circuit board 201 includes image-processing circuits 201a and 201b that process an image signal that is output from the image pickup device 8. Reference numeral 202 denotes adhesive. The sensor plate 200 is fixed to the zoom body 64 with a plurality of fixing screws 203.

As illustrated in FIGS. 21 to 24, the sensor plate 200 includes a holding portion 200a substantially flush with a surface of the image pickup device 8 on the rear side in the direction of the optical axis B, and a connecting portion 200b extending from the holding portion 200a in the direction of the optical axis B and beyond the image plane toward a side opposite the object side.

The adhesive 202 is provided into a gap between the holding portion 200a and three of the peripheral sides of a surface of the image pickup device 8 that is orthogonal to the optical axis B, whereby the image pickup device 8 is fixed to the sensor plate 200.

The connecting portion 200b and the image pickup device 8 are connected to the holding portion 200a, having a U shape, in such a manner as to surround the image pickup circuit board 201 when seen in the direction of the optical axis B. With such a connection between the holding portion 200a and the connecting portion 200b, the component accuracy of the sensor plate 200 is increased, the sensor plate 200 is prevented from interfering with the operation member 204, and the thickness of the camera body 100 in the direction of the optical axis A is reduced.

SUMMARY

As described thus far, the present embodiment employs a configuration in which the difference between the distance L from the zoom drive unit 110, which is a source of noise, to the left-channel microphone 104L and the distance R from the zoom drive unit 110 to the right-channel microphone 104R does not increase with increases in the distances L and R in the camera body 100. Hence, the level of noise from the zoom drive unit 110 that may be recorded in the zooming or focusing operation performed while a movie is being taken is lowered with no significant difference between the levels of noise received by the left and right channels.

Furthermore, in the drive unit (110), a plurality of motors are arranged along the second optical axis (B), and the main capacitor (107) is provided across the second optical axis (B) from the drive unit (110) in such a manner as to extend along the second optical axis (B). Thus, the space is efficiently used, and the size of the camera is reduced.

The configuration of the present invention is not limited to those exemplified in the above embodiment. The materials, shapes, dimensions, modes, numbers, positions, and so forth of the individual elements may be modified appropriately without departing from the spirit of the present invention.

For example, although the above embodiment concerns a case where the catoptric element is exemplified as the prism 6, the catoptric element is not limited thereto and may be a mirror or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-183053 filed Aug. 18, 2010, which is hereby incorporated by reference herein in its entirety.

What is claimed is:

1. An optical apparatus comprising:
a catoptric element that causes incoming light traveling from an object in a direction of a first optical axis to be refracted in a direction of a second optical axis;
a motor that drives an optical member provided on the second optical axis; and
a stereo microphone comprising a left-channel microphone and a right-channel microphone that are provided on a side of the optical apparatus opposite the motor with respect to the second optical axis when seen from an object side and arranged in a direction substantially parallel to the second optical axis;
a main capacitor for strobe illumination provided on the side of the optical apparatus opposite the motor with respect to the second optical axis such that a longitudinal direction of the main capacitor is parallel to the second optical axis,
wherein the stereo microphone is provided near an end of the optical apparatus on one side with respect to the first optical axis, and the main capacitor is provided near an end of the optical apparatus on the other side with respect to the first optical axis.

2. The optical apparatus according to claim 1, wherein the stereo microphone is more remote from the motor than the main capacitor.

* * * * *